(12) United States Patent
Mitlin et al.

(10) Patent No.: US 10,614,965 B2
(45) Date of Patent: Apr. 7, 2020

(54) ACTIVATED CARBONS FROM DAIRY PRODUCTS

(71) Applicant: Clarkson University, Potsdam, NY (US)

(72) Inventors: David Mitlin, Lakeway, TX (US); Jesse Pokrzywinski, Potsdam, NY (US)

(73) Assignee: Clarkson University, Potsdam, NY (US)

( * ) Notice: Subject to any disclaimer, the term of this patent is extended or adjusted under 35 U.S.C. 154(b) by 374 days.

(21) Appl. No.: 15/350,834

(22) Filed: Nov. 14, 2016

(65) Prior Publication Data

US 2017/0140881 A1 May 18, 2017

Related U.S. Application Data

(60) Provisional application No. 62/303,468, filed on Mar. 4, 2016, provisional application No. 62/255,070, filed on Nov. 13, 2015.

(51) Int. Cl.

| | |
|---|---|
| *H01M 4/587* | (2010.01) |
| *H01M 10/42* | (2006.01) |
| *H01M 4/04* | (2006.01) |
| *H01G 11/34* | (2013.01) |
| *H01G 11/86* | (2013.01) |
| *H01G 11/62* | (2013.01) |

(Continued)

(52) U.S. Cl.
CPC .......... *H01G 11/34* (2013.01); *C01B 32/318* (2017.08); *C01B 32/342* (2017.08); *H01G 11/26* (2013.01); *H01G 11/44* (2013.01); *H01M 4/587* (2013.01); *C01P 2006/16* (2013.01); *C01P 2006/40* (2013.01); *H01G 11/06* (2013.01); *H01M 2004/021* (2013.01); *Y02E 60/13* (2013.01)

(58) Field of Classification Search
CPC combination set(s) only.
See application file for complete search history.

(56) References Cited

U.S. PATENT DOCUMENTS

| | | | |
|---|---|---|---|
| 5,147,590 A | 9/1992 | Preidel et al. | |
| 8,426,061 B2 * | 4/2013 | Nesper .................. | H01M 4/136 429/209 |

(Continued)

FOREIGN PATENT DOCUMENTS

WO     2014/162267     10/2014

OTHER PUBLICATIONS

International Search Report and Written Opinion Form PCT/ISA/220, International Application No. PCT/US2016/061852, pp. 1-15, dated Mar. 31, 2017.

*Primary Examiner* — Kaity V Chandler
(74) *Attorney, Agent, or Firm* — Murtha Cullina LLP

(57) ABSTRACT

An electrode of an energy storage device and methods of fabrication are provided which include: pyrolyzing a carbon-containing precursor to form a stabilized-carbonized material; and annealing the stabilized-carbonized material to form a structurally-modified activated carbon material. The structurally-modified activated carbon material includes a tunable pore size distribution and an electrochemically-active surface area. The electrochemically-active surface area of the structurally-modified activated carbon material is greater than a surface area of graphene having at least one layer, the surface area of the graphene having at least one layer being about 2630 $m^2\ g^{-1}$.

20 Claims, 12 Drawing Sheets

(51) Int. Cl.

| | |
|---|---|
| *H01G 11/06* | (2013.01) |
| *H01G 11/78* | (2013.01) |
| *H01G 11/26* | (2013.01) |
| *H01G 11/44* | (2013.01) |
| *C01B 32/318* | (2017.01) |
| *C01B 32/342* | (2017.01) |
| *H01M 4/02* | (2006.01) |

(56) References Cited

U.S. PATENT DOCUMENTS

| | | | |
|---|---|---|---|
| 8,507,135 B2 * | 8/2013 | Grupp | H01M 4/043 |
| | | | 252/506 |
| 9,209,459 B2 | 12/2015 | Nagai et al. | |
| 9,368,798 B2 | 6/2016 | Kostecki et al. | |
| 2007/0298006 A1 * | 12/2007 | Tomalia | A01N 25/10 |
| | | | 424/78.03 |
| 2009/0136827 A1 * | 5/2009 | Minteer | C12N 9/0004 |
| | | | 429/401 |
| 2011/0039164 A1 * | 2/2011 | Akers | H01M 4/86 |
| | | | 429/401 |
| 2011/0082024 A1 * | 4/2011 | Liu | A61K 9/51 |
| | | | 502/5 |
| 2013/0209348 A1 * | 8/2013 | Ludvik | H01M 4/133 |
| | | | 423/460 |
| 2013/0280601 A1 * | 10/2013 | Geramita | H01M 4/133 |
| | | | 429/204 |
| 2015/0180022 A1 * | 6/2015 | Beck | C01B 25/375 |
| | | | 429/221 |
| 2015/0232340 A1 | 8/2015 | Bao et al. | |
| 2016/0172653 A1 * | 6/2016 | Henderson | H01M 10/425 |
| | | | 429/7 |

* cited by examiner

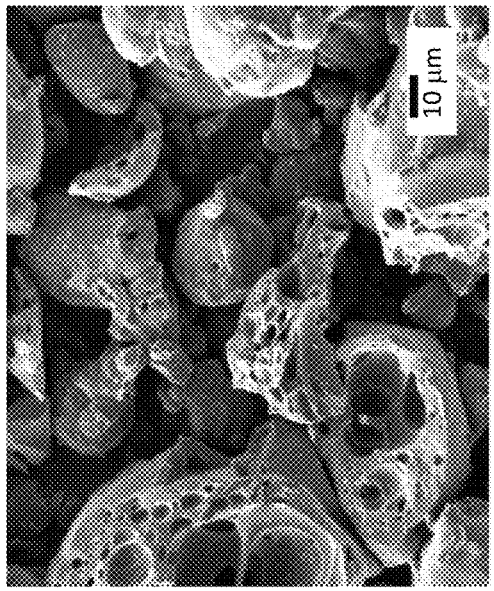
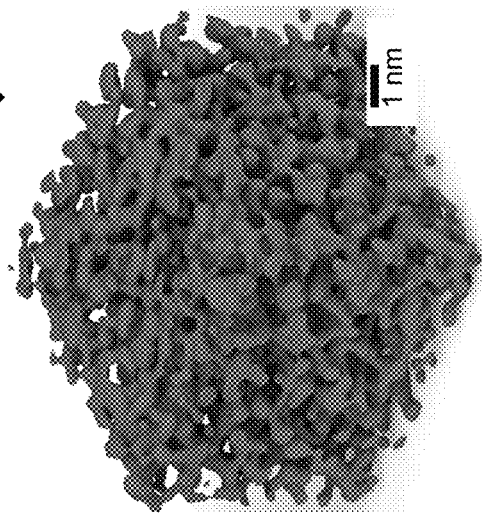
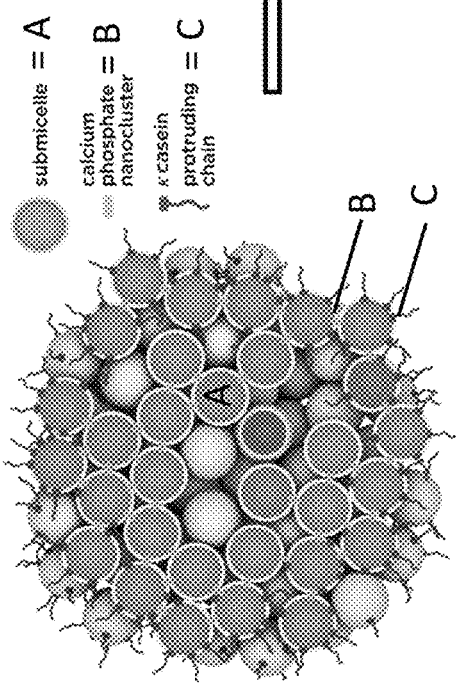
FIG. 1B
FIG. 1C
FIG. 1A

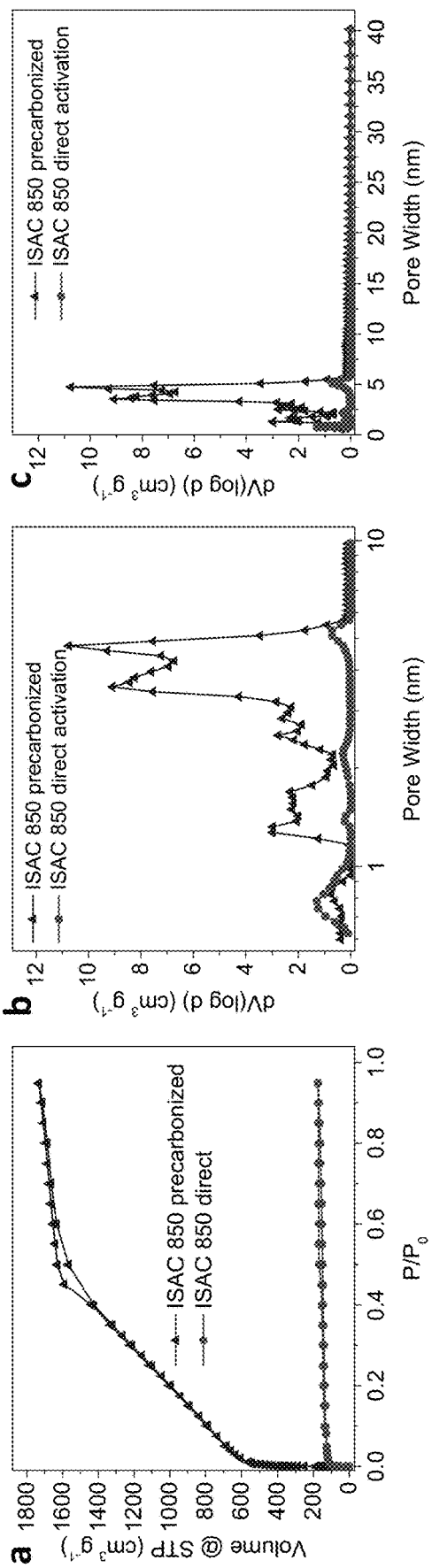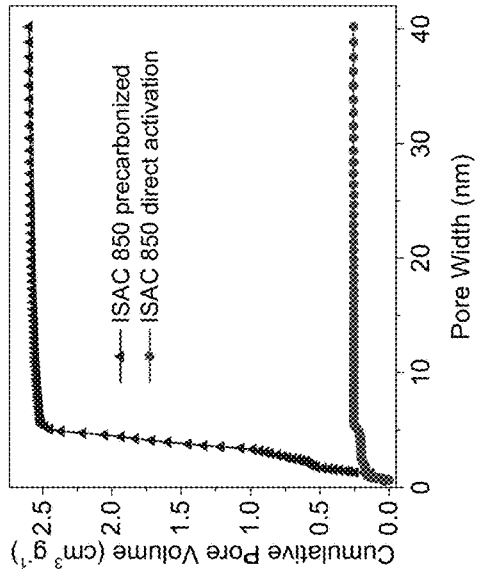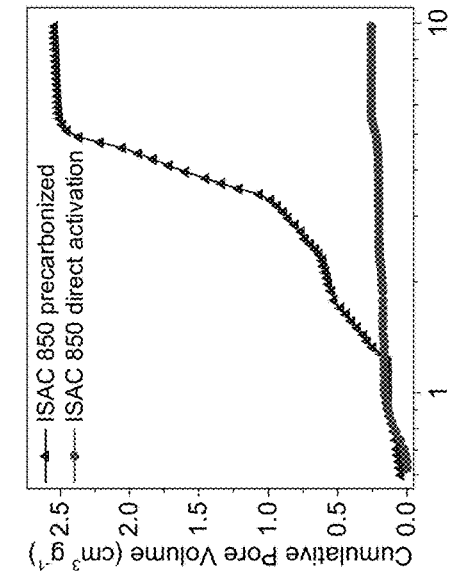
FIG. 5G
FIG. 5H
FIG. 5I
FIG. 5J
FIG. 5K

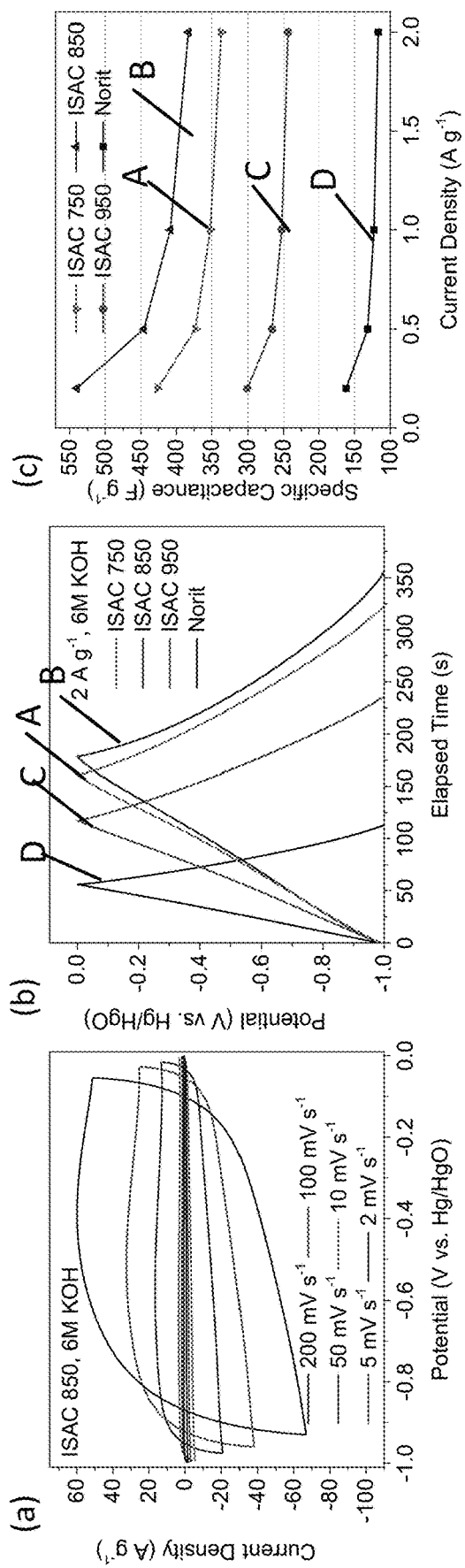

ACTIVATED CARBONS FROM DAIRY PRODUCTS

CROSS-REFERENCE TO RELATED APPLICATION

This application claims the benefit of U.S. Provisional Patent Application No. 62/255,070, filed Nov. 13, 2015, entitled "Activated Carbon from Dairy Products" and U.S. Provisional Patent Application No. 62/303,468, filed Mar. 4, 2016, entitled "Carbons with Quasiperiodic Porosity and Surface Area Surpassing Graphene", which are hereby incorporated herein by reference in its entirety.

BACKGROUND

Energy-storage devices, such as, ultracapacitors (e.g., supercapacitors, electrochemical capacitors), have conventionally been designed for high rate-high cyclability energy storage, albeit at roughly a hundred times lower gravimetric and volumetric energy, as compared to lithium ion batteries. Some of the end-uses for ultracapacitors, for instance, include solar and wind capacity firming, grid power regulation and leveling, voltage control, windmill pitch control, heavy truck/bus transport start-stop assist, and peak power assist, industrial shut-down support, among others. One way to classify supercapacitor devices is by their primary charge storage mechanism. As one skilled in the art will understand, most commercial ultracapacitor devices are exclusively electrical double layer capacitance (EDLC) devices which, for instance, store energy through reversible accumulation of charged ions in a double layer at an electrode's surface. While research is ongoing in alternative electrolytes, such as, ionic liquids (ILs), most commercial devices operate using a salt dissolved in an organic electrolyte that is designed to minimize parasitic side reactions at high voltages, for instance considering the Maxwell K2 Cell offering. It is recognized however that an aqueous electrolyte has substantial advantages in terms of safety, environmental friendliness and potential cost reduction. Akin to aqueous batteries, aqueous supercapacitors can have a major impact in the stationary energy storage arena where the intrinsic low cost and safety of water-based systems are a major premium.

As understood, pseudocapacitors are another class of ultracapacitor-like energy storage materials, with energy storage capability primarily originating from reversible faradaic reactions that occur at, and near the active material's (e.g., electrode's) surface. The use of pseudocapacitors on the positive electrode (also referred to as "hybrid devices") does significantly boost the energy of aqueous devices, as the oxides or oxynitrides utilized therein have capacitance values as high as 1,000-2,000 F $g^{-1}$. Moreover, a hybrid configuration (e.g., oxide on the positive electrode, carbon on the negative electrode), does somewhat extend the device voltage window by kinetically suppressing the decomposition of water above 1.2 V. Nanostructured oxides and nitrides, such as various forms of $MnO_2$, $Fe_2O_3$, $NiCo_2O_4$, $Nb_2O_5$, $MnMoO_4/CoMoO_4$, $Co_3O_4$, $CoMoO_4$ and VN are widely used for this application. As one skilled in the art will understand, the extent of the parallel EDLC contribution to energy storage in pseudocapacitor systems will depend on the surface area of the active (i.e., electrode) materials. Even the best performing nanostructured oxides, will typically possess surface areas that are at, or below 300 $m^2$ $g^{-1}$, which typically gives a relatively modest EDLC response. Oxide-based faradaic systems have seen less commercial activity, presumably due to a combination of increased electrode cost and the inherent propensity of most oxides to coarsen over time, due to voltage-induced dissolution or dissolution-reprecipitation. Unfortunately, oxides and oxynitrides are not fully stable during extended charging-discharging, leading to lifetimes of 10,000 cycles or less for even the state-of-the-art systems.

Thus, there remains a need for enhanced energy-storage devices, and in particular, a need for novel, organic EDLC device that utilizes an all-carbon symmetrical electrode configuration in an aqueous electrolyte for enhanced performance efficiency of such devices.

SUMMARY

The present invention is directed to, inter alia, a structurally-modified activated carbon material for use, for instance, with a variety of energy storage devices. In one embodiment, the structurally-modified activated carbon material has been fabricated from a carbon-containing multiphase precursors (obtained, for instance, from plant-based materials, a diary-based materials and the like) using a two-step fabrication process. The two-step fabrication process, in one example, involves pyrolysis process at a temperature that is sufficient to at least partially hydrolyze the carbon-containing multi-phase precursor to form a stabilized-carbonized material. In one embodiment, the stabilized-carbonized material may subsequently be combined with an inorganic base and annealed at temperatures that are higher than those of the pyrolysis process to form a structurally-modified activated carbon material.

As disclosed herein, the structurally-modified activated carbon material has, in one embodiment, a tunable pore distribution that is modulated to have microporosity and mesoporosity, and an electrochemically-active surface area that is greater than the surface area of one or more graphene layers. In one embodiment, the structurally-modified activated carbon material has enhanced energy storage capacity relative to a corresponding current density, owing to mesoporosity of the structurally-modified activated carbon material. Further, in another embodiment, the structurally-modified activated carbon material may be a doped carbon material or an undoped carbon material, depending upon the heteroatom content of the carbon-containing multiphase precursor material. In one example, the doped carbon material of the structurally-modified activated carbon material may be doped with a dopant (for instance, nitrogen, oxygen, and the like) having an atomic content of about 0.2 weight % to about 20 weight % of a total weight of the structurally-modified activated carbon material. Additionally, the structurally-modified activated carbon material has been found to have enhanced cyclability relative to that of a conventional activated carbon.

In one aspect of the present application, a method for fabricating an electrode of an energy storage device is provided which includes: pyrolyzing a carbon-containing precursor to form a stabilized-carbonized material; and annealing the stabilized-carbonized material to form a structurally-modified activated carbon material, wherein the structurally-modified activated carbon material includes a tunable pore size distribution and an electrochemically-active surface area, the electrochemically-active surface area being greater than a surface area of graphene having at least one layer, the surface area of the graphene having at least one layer being about 2630 $m^2 g^{-1}$.

According to an embodiment, the pyrolyzing of the carbon-containing precursor at least partially hydrolyzes to form the stabilized-carbonized material, where the electrochemically-active surface area of the structurally-modified activated carbon material is greater than the surface area of the stabilized-carbonized material.

According to an embodiment, the pyrolyzing of the carbon-containing precursor is performed at a temperature that is lower than the annealing of the stabilized-carbonized material.

According to an embodiment, the method further includes chemically activating the stabilized-carbonized material, concurrently with the annealing, with an inorganic base to form the structurally-modified activated carbon material, where the chemically activating of the stabilized-carbonized material defines the tunable pore size distribution of the structurally-modified activated carbon material.

According to an embodiment, the tunable pore size distribution of the structurally-modified activated carbon material is modulated to have at least one of micropore volume and a mesopore volume, the mesopore volume being equal to or greater than the micropore volume of a total pore volume disposed therein.

According to an embodiment, the structurally-modified activated carbon material has an enhanced energy storage capacity relative to a corresponding current density, the enhanced energy storage capacity being a function of the mesopore volume distributed within the structurally-modified activated carbon material.

According to an embodiment, the structurally-modified activated carbon material has a microporosity of a pore size that is less than 2 nm, and a mesoporosity of a pore size within a range of about 2 nm to about 50 nm.

According to an embodiment, the structurally-modified activated carbon material comprises at least one of an undoped carbon material and a doped carbon material, where a dopant of the doped carbon material is at least one of a nitrogen atom and an oxygen atom, the dopant having an atomic content of about 0.2 weight % to about 20 weight % of a total weight of the structurally-modified activated carbon material.

According to an embodiment, the carbon-containing precursor includes at least one of a plant-based precursor material, a dairy-based precursor material, a fossil-fuel precursor material, industrial or research-grade polymer precursor material, an organic solution precursor material, a waste product precursor material, a biological tissue precursor material, a metal-organic framework precursor material, and a carbon-containing synthetic precursor material.

In another aspect of the present invention, an electrode of an energy storage device is provided. The electrode includes: a structurally-modified activated carbon material, the structurally-modified activated carbon material including a tunable pore size distribution and an electrochemically-active surface area is greater than a surface area of graphene having at least one layer, the surface area of graphene having at least one layer being about 2630 $m^2g^{-1}$.

In another aspect of the present invention, a positive electrode of an ion energy storage device is provided. The positive electrode includes: a structurally-modified activated carbon material, the structurally-modified activated carbon material including a tunable pore size distribution and an electrochemically-active surface area is greater than a surface area of graphene having at least one layer, the surface area of graphene having at least one layer being about 2630 $m^2g^{-1}$.

In another aspect of the present invention, a negative electrode of an ion energy storage device is provided. The negative electrode includes: a structurally-modified activated carbon material, the structurally-modified activated carbon material including a tunable pore size distribution and an electrochemically-active surface area is greater than a surface area of graphene having at least one layer, the surface area of graphene having at least one layer being about 2630 $m^2g^{-1}$.

In another aspect of the present invention, an energy storage device is provided. The energy storage device includes: an electrode, the electrode comprising a structurally-modified activated carbon material, the structurally-modified activated carbon material including a tunable pore size distribution and an electrochemically-active surface area is greater than a surface area of graphene having at least one layer, the surface area of graphene having at least one layer being about 2630 $m^2g^{-1}$.

In yet another aspect of the present invention, an energy storage device is provided. The energy storage device includes: an anode; and a cathode, wherein at least one of the anode and the cathode include a structurally-modified activated carbon material, the structurally-modified activated carbon material including a tunable pore size distribution and an electrochemically-active surface area is greater than a surface area of graphene having at least one layer, the surface area of graphene having at least one layer being about 2630 $m^2g^{-1}$.

In yet another aspect of the present invention, an energy-storage device is provided. The energy-storage device includes: a housing, the housing including dimensions that conform to standardized battery dimensions; and a capacitor cell, the capacitor cell disposed in the housing and electrically coupled to the housing, wherein the capacitor cell includes at least one of a positive electrode and a negative electrode, the at least one positive electrode and the negative electrode including a structurally-modified activated carbon material, the structurally-modified activated carbon material including a tunable pore size distribution and an electrochemically-active surface area is greater than a surface area of graphene having at least one layer, the surface area of graphene having at least one layer being about 2630 $m^2g^{-1}$. In this embodiment, the energy-storage device may include at least one of an electrochemical capacitor, primary or secondary battery, a flow battery, a dionization capacitor, a supercapattery, and other energy storage system based on ions that are reversibly or irreversibly stored at a positive electrode and a negative electrode.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following description taken in conjunction with the accompanying drawings in which:

FIGS. 1A-1C illustrates a schematic representation of one embodiment of a fabrication process of a structurally-modified activated carbon material for use, for instance, with an energy-storage device, in accordance with one or more aspects of the present invention.

FIGS. 5A-5K depict representative examples of experimental data obtained for the structurally-modified activated carbon material relative to that of a standardized commercially-available activated carbon, in accordance with one or more aspects of the present invention.

DETAILED DESCRIPTION

Figure 2:
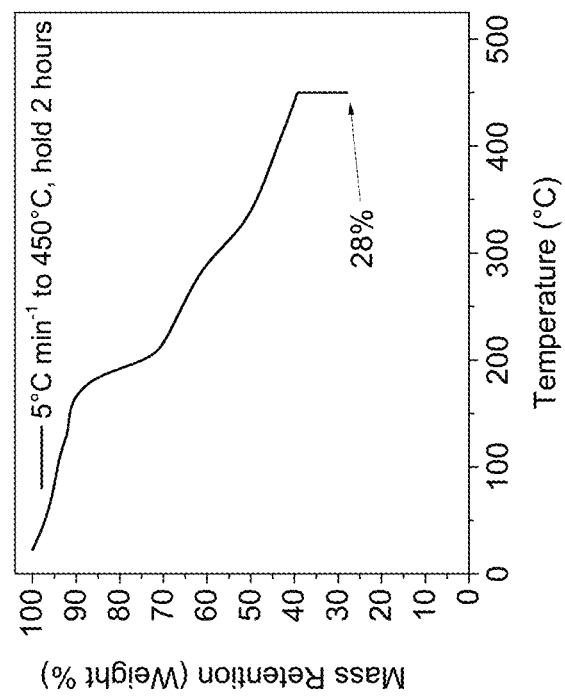
FIG. 2 is a graphical representation of one embodiment of a thermogravimetric analysis (TGA) of a carbon-containing precursor material upon pyrolysis thereof, in accordance with one or more aspects of the present invention.
Figure 3A:
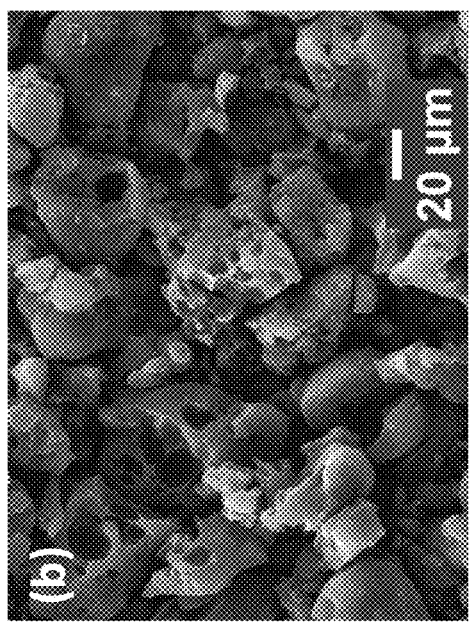
FIGS. 3A-3D depict a representative example of a scanning electron microscope (SEM) micrographs of the structurally-modified activated carbon material relative to that of a standardized commercially-available activated carbon, in accordance with one or more aspects of the present invention.
Figure 3B:
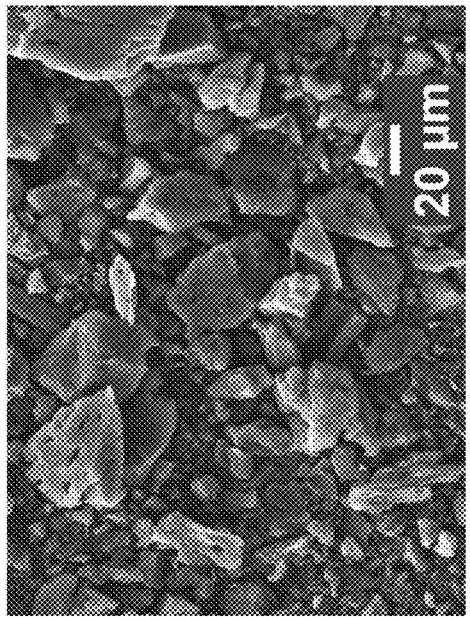
Figure 3C:
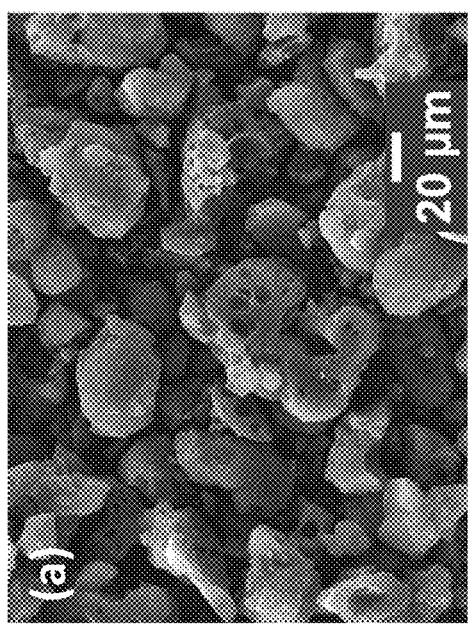
Figure 3D:
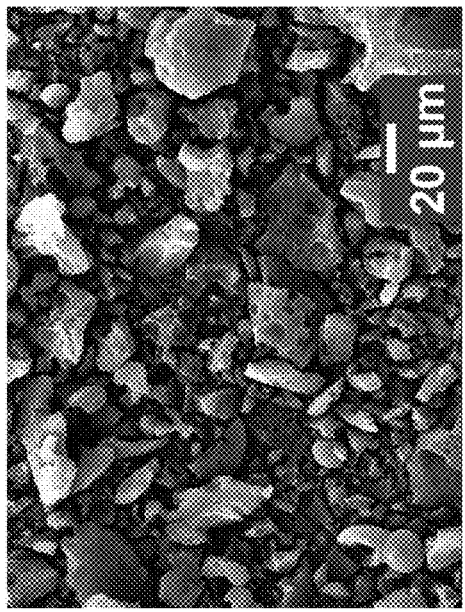

Aspects of the present invention and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific example, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

As noted, enhanced energy-storage devices, such as, ultracapacitors (e.g., supercapacitors, electrochemical capacitors) having advanced carbon material as electrodes that can operate in an aqueous electrolyte, continue to be developed for enhanced efficiency and performance of such devices. As one skilled in the art will understand, advanced carbon materials currently employed in conventional energy-storage devices typically have both high surface area-pore volume that is of an order of magnitude of about 100 m^2/g and beyond, with varied heteroatom content depending on the end-use (that includes, for instance, nitrogen (N), oxygen (O), phosphorus (P) and boron (B) derived from precursors that are rich in such heteroatoms). As understood, these advanced carbon materials can have specific capacitance, typically in the range of about 200 to 550 F g-$^1$, at low (e.g., 0.05 A/g at 1 mV/s) current densities. Such specific capacitance may be attributed to a combination of EDLC and reversible faradaic contribution of the heteroatom surface functionalities. Disadvantageously, although such heteroatom-rich pseudocapacitive carbons exhibit increased specific capacitance at very low and intermediate current densities, the specific capacitance of such materials has found to be significantly decreased at higher current densities. For example, poly(o-phenylenediamine)-derived carbon in the form of crumpled nanosheets, exhibited a record-breaking specific capacitance over 600 F $g^{-1}$ at 1 mV $sec^{-1}$ (~1000 sec charge time), degrading to ~75 F $g^{-1}$ at 100 mV $sec^{-1}$. This critical shortcoming may be inherent to the reversible faradaic processes involved, which occur on longer time scales than EDLC adsorption-desorption.

Further, energy-storage devices utilizing heteroatom-rich advanced carbon materials have additionally been found to have substantially reduced cyclability. While the mechanism has not been examined in detail, performance degradation of such advanced carbon materials may most likely occur as a result of dissolution or deactivation of redox active surface moieties. As one skilled in the art will understand it is difficult to find examples in literature where cycling life of heteroatom-rich activated carbon materials (e.g., N-rich, O-rich, etc.,) has exceeded 10,000 full charge-discharge cycles. Tests in the literature are typically concluded after 10,000 cycles, with capacity retention values of 75%-85% being typically reported.

Still further, and as understood, the efficiency of a conventional commercially-available energy-storage device (including, for instance, supercapacitor cell) is dependent upon its cyclability, both in terms of charge-discharge numbers and the rates that may be employed. However for supercapacitors to be commercially viable, this has to be done at a low or moderate cost. As a result, existing commercial supercapacitor cells are primarily based on activated carbon, rather than on carbon nanotubes (CNTs), graphene materials, or nanostructured oxides. Commercial energy-storage devices typically employ an organic liquid electrolyte with a dissolved salt, for example, tetraethylammonium tetrafluoroborate ($TEABF_4$) in acetonitrile. Yet a comparable energy and power (for instance, about 5 Wh $kg^{-1}$ by device weight, about 20 Wh $kg^{-1}$ by electrode material weight) supercapacitor cell based on an aqueous electrolyte offers reduced cost and improved safety.

To summarize, as an enhancement to existing energy-storage devices, disclosed herein is an energy-storage device that includes an activated carbon material that has been structurally-modified to have a surface area and pore volume that is greater than those of any commercially-available activated carbon material typically obtained from conventional polymer-based carbon precursors. Note that, although the use of the structurally-modified activated carbon material has been exemplified in energy-storage devices (e.g., batteries, supercapacitors, etc.), the structurally-modified activated carbon material may also be utilized in a variety of applications, as the heteroatoms and/or the dopants disposed therein may provide unique chemical, electrical and electrochemical properties to the material, while the enhanced electrochemically-active surface area and the tunable pore size distribution may provide ample reaction sites. For instance, the structurally-modified activated carbon material may be employed in a variety of applications, such as, energy conversion (e.g., fuel cell, electrolyzer supports, etc.), catalysts (e.g., platinum (Pt) supports oxygen reduction, hydrogenation catalyst supports), water treatment, $CO_2$ capture and other gas separation applications. It may also be employed as a host to other electrochemically active materials. One example includes storing Na, Se, or Si inside its pores and/or on its surface for lithium ion battery applications. Another example includes storing redox active oxides and nitrides, such as, $Fe_2O_3$, NiO, $Co_3O_4$, $Mn_xO_y$, $Ru_xO_y$, or $Fe_3O_4$ for supercapacitor applications. Another end use is for this material to be employed as an ancillary phase in an electrode, in parallel with a primary material, such as, graphite. For supercapacitor applications, this structurally-modified activated carbon material may be employed with aqueous, organic and ionic liquid electrolytes, along with any hybrid electrolyte system.

By way of example, the structurally-modified activated carbon material may be utilized as an, for instance, but are not limited to, a) enhanced performance electrode in lithium ion batteries, sodium ion batteries, magnesium ion batteries, aluminum ion batteries, etc.; b) enhanced electrodes for electrochemical capacitors, i.e., supercapacitors; c) as enhanced electrodes for hybrid battery-supercapacitor devices; d) enhanced electrodes for fuel cell and electrolyzer anodes and cathodes, as a high surface area catalyst support and/or as the catalyst per se; e) enhanced high surface area support for conventional catalysts, replacing a range of carbons and non-carbons currently employed; f) enhanced carbon for water treatment, such as, hydrocarbon or heavy metal removal and desalination including capacitive desalination; and g) enhanced carbon for gas separation, carbon dioxide ($CO_2$) capture, and vehicle emissions control. By way of example, in one embodiment, the structurally-modified activated carbon material (e.g., EDLC carbon) disclosed herein is substantially pure with an enhanced electrochemically-active surface area and tunable porosity that allows enhancing specific capacitance at both low and high charging rates, and a stable lifetime of 100,000 full charge-discharge cycles. The major advancement in the structure of the activated carbon electrode disclosed herein allows for comparable energy—cyclability cells that run on aqueous rather than organic electrolyte. However, a comparable specific capacitance advantage due to the mesopores would be realized with an organic electrolyte, or ionic liquid electrolyte system as well, including electrolytes employed commercially by device manufacturers such as Maxwell.

FIGS. 1A-1C illustrate a schematic representation of one embodiment of a fabrication process of a structurally-modified activated carbon material (FIG. 1C) for use, for instance, with an energy-storage device, in accordance with one or more aspects of the present invention. By way of example, in one embodiment, the structurally-modified activated carbon material (FIG. 1C) may be obtained, for instance, from a carbon-containing precursor (See FIG. 1A) (which, for instance, includes a biphasic, triphasic or multiphasic carbon-containing precursors) using a two-step fabrication process that involves a low temperature pyrolysis process which stabilizes an intermediate carbon structure, followed by a high-temperature combined activation-annealing process. In one example, the carbon-containing precursor, may be, or may include, any carbon-rich precursor material, such as, a plant-based precursor material, a dairy-based precursor material, a fossil-fuel precursor material, industrial or research-grade polymer precursor material, an organic solution precursor material, a waste product precursor material, a biological tissue precursor materials, a metal organic framework precursor material, and a carbon-containing synthetic precursor material. Examples of the plant-based precursor materials may be, or may include, but are not limited to, hemp hurd, hemp fiber, cellulose, lignin, hemicellulose, combinations of cellulose, lignin and hemicellulose, mixed hemp products, various wood products, sawdust, soy hulls, rice hulls, wheat straw, hurd and fiber from ramie, hurd and fiber from jute, hurd and fiber from flax, hurd and fiber from keenaf and the like.

In another example, the carbon-containing precursors may be, or may include, dairy-based precursor material, such as, but not limited to, milk obtained from, but is limited to that produced by mammals (i.e., produced in the mammary glands of mammals), such as, cow, sheep, ox, goat, yak, lama, water buffalo or any other milk-producing living mammal. Still further, the dairy-based precursor materials may be, or may include, but not limited to, any dairy product or combination thereof, such as, raw milk, unprocessed milk, waste milk, whole milk, low fat milk, no fat milk, skim milk, buttermilk, spoiled milk, milk-derived baby formula, or may be prepared from dehydrated milk, commercial milk powder, evaporated milk or isolated milk protein such as casein or whey proteins. The dairy precursor material may be, or may include, homogenized, pasteurized, sterilized, refined, or otherwise processed for any number of reasons such as palatability, biological health and safety, shelf-life, or packaged for transportation or consumption, or may be in bulk form, for example. Furthermore, carbons with similar characteristics may be produced from any number of combinations of blended materials that are found in or derived from dairy products. For example, lactose, whey protein, and butter may also be combined in ratios that would closely simulate raw milk and can be used to produce heteroatom rich, high surface area carbons possessing similar performance characteristics to those obtained from the aforementioned dairy precursors. In another example, the industrial or research-grade polymer precursor material may be, or may include, but are not limited to, phenolic resin, polyvinylidene fluoride, polyacrylonitrile, polyethylene-terephthalate and the like.

In one implementation, the carbon-containing precursor (FIG. 1A) may be subjected to a two-step fabrication process to form the structurally-modified activated carbon material, as depicted in FIGS. 1A-1C. Note that, as described above, although the carbon-containing precursor employed in the fabrication process can extend to any of the above-described precursor materials, a micellar structure of a milk product (and in particular, a bovine milk product) is used as a specific example to describe the fabrication process for the sake of clarity. By way of example, as described below, the synergy between the casein miceller structure and the inherent stability of the milk proteins have been exploited using the two-step fabrication process described herein, and in particular, using a low temperature pyrolyzing process, to stabilize and preserve the intermediate 3-D structure of the carbon-containing precursor material. Stabilization of the nano-scale structure of the milk powder precursor allows for extremely fine KOH (i.e., inorganic base) attack during the subsequent high temperature combined heat treatment-activation process. As will be demonstrated, further below, without the 450° C. step, the resultant carbon is quite routine in terms of its surface area and pore volume.

As understood, bovine milk protein composition consists of about 80% casein proteins and about 20% soluble whey proteins. The four main casein proteins ($\alpha_{s1}$-, $\alpha_{s2}$-, $\beta$-, and $\kappa$-casein having a molar ratio of 4:1:3.5:1.5, respectively) naturally self-assemble, along with inorganic calcium phosphate "nanoclusters" (see "B" of FIG. 1A), into highly stable micellar structures. Milk is bluish-white in color because there are about $10^{15}$ light scattering casein micelles dispersed in every milliliter of milk. In as obtained milk, the spherical diameter of casein micelles is between 80-400 nanometers, with an average of about 200 nanometers. In the actual milk powder, the diameter of the micelles is expected to shrink drastically due to the ultra-rapid dehydration process associated with its production, whereby condensed milk is sprayed or atomized in a 205° C.

Micelle stability is based on three integral components of the micelle system: 1) $\kappa$-casein, 2) colloidal calcium phosphate (CCP), and 3) hydrophobic interactions. Altering any of the components that affect their stability can either result in micellar aggregation or dissociation into their submicellar components (see "A" of FIG. 1A). κ-casein contributes to micellar stability in water, primarily through steric hindrance between caseinomacropeptides (CMP) extending from the micelle surface which prevents excessive agglomeration, and to a lesser degree through its negatively charged, hydrophilic surface character. On the other hand, casein micelles are stabilized internally through hydrophobic interactions, hydrogen bonding, and the bridging of CCP to form calcium phosphate nanoclusters (See "B" of FIG. 1A), all of which give rise to a primarily hydrophobic core. Within the casein micelles, up to 13 negatively charged phosphate groups are covalently bonded to serine residues along the amino acid backbone of the 4 major casein proteins. Internally, these phosphoserine groups in turn bond to divalent calcium ions, which in turn bond to orthophosphate, which bonds to another divalent calcium ion, and so forth, to form a nanocluster of calcium phosphate (See "B" of FIG. 1A), which ultimately bonds to a phosphoserine residue of another casein molecule (See "C" of FIG. 1A) and terminates the cycle. In this manner, calcium phosphate nanoclusters (~2-3 nm) are effectively the glue that binds around 10,000 casein molecules together into a single stable casein micelle.

The casein micelle is remarkably thermally stable; up to 140° C. in milk. Furthermore, upon heating, the relatively small amount of whey protein or lactose that potentially exists can react with the K-casein molecules that are primarily external to the micelle to form a stable complex. Therefore during spray drying whereby powdered milk is produced, the micellar structure and composition remains largely unchanged while only free water is removed. The presence of intact casein micelles and their substructure in the powder state was demonstrated for the first time recently using small angle X-ray scattering (SAXS) measurements. Even when calcium phosphate is dissolved out of the micelles through acidification, the micellar integrity is largely maintained, demonstrating considerable stability.

It may be hypothesized that due to the fact micelle motion is hindered within the milk powder, the overall arrangement may be preserved during heating to 450° C., but with an overall scale that is reduced. Specifically, during low temperature pyrolysis, the calcium phosphate nanocluster-casein protein associations that remain in the dry milk may serve as a "support framework" for three-dimensional nanoscale structure development and preservation of the carbon product. In effect, they may prevent the carbon from becoming homogeneous. As bound water and other labile components are removed, some phosphoric acid may be generated. At 450° C., the phosphoric acid may be volatilized quite rapidly as its boiling point is 407° C. Note that, both phosphoric acid and calcium are known porogens. As may be observed in the SEM micrographs (FIGS. 1A-1C), limited macropore development may actually occur at low temperature as the phosphoric acid is evaporated and carried away in the inert gas stream. During chemical KOH activation at higher temperatures (750° C.-950° C.), micropore and mesopore development dominates, resulting in an extremely high surface area and pore volume.

Further, in conventional activated carbons (ACs) processed with an inorganic base, such as, KOH, the mechanism of activation-carbonization is partially understood. In general, processes begin with low temperature solid state reactions between KOH and the carbon, followed by a series of solid-liquid reactions that include the intercalation of liquid K in its reduced state into the defective regions of the carbon. Liquid K intercalation nominally occurs above 700° C. It is this liquid-intercalation that is in large part responsible for the formation of the nanopores in the final granular AC. For instance, the following reaction sequences have been proposed for conventional ACs and may be present with gas-liquid chromatography (GLC) formation at sub 700° C. temperatures: $2KOH \Rightarrow K_2O+H_2O$, $C+H_2O \Rightarrow CO+H_2$, $CO+H_2O \Rightarrow CO_2+H_2$, $CO_2+K_2O \Rightarrow K_2CO_3$. An alternative reaction sequence has been proposed as well (same reference set) at 400° C., there is a reaction $6KOH+2C \Rightarrow 2K+3H_2+2K_2CO_3$. Following at higher temperatures there is the following process, with liquid K being the only potassium containing phases at above 700° C.: $K_2CO_3 \Rightarrow K_2O+CO_2$; $CO_2+C \Rightarrow 2CO$, $K_2CO_3+2C \Rightarrow 2K+3CO$; $K_2CO_3+2C \Rightarrow 2K+3CO$, $C+K_2O \Rightarrow 2K+CO$. Intercalated metallic K is then removed, leaving behind nanopores. The key point for activation using KOH is that the pore, periodicity, mean diameter, total volume, etc. are all critically dependent on the heterogeneity in the structure and chemistry of the carbon during the activation process. The micelle-stabilized structure of the post-450° C. carbon make it heterogeneous on a chemical/structural scale that is remarkably fine. This in-turn serves as a template for the various stages of KOH attack. Thus the resultant porosity is effectively unparalleled even as compared to more expensive and less environmentally friendly precursors based on commercial polymers, such as polyaniline, polyacrylamide, polyacrylonitrile, polyethylene terephthalate.

By way of example, and in one embodiment, the fabrication process proceeds by pyrolyzing the carbon-containing precursor material, such as, the bovine milk protein, at a temperature that is sufficient to at least partially hydrolyze the carbon-containing precursor material to form a stabilized-carbonized material (See FIG. 1B). In one embodiment, the carbon-containing precursor material may be pyrolyzed at a temperature within a range of about 100° C. to about 700° C. for about 2 hours in the presence of an inert gas, such as, argon. Note that, the 3-D microstructure of the stabilized-carbonized material is preserved and stabilized as indicated by the morphology thereof, depicted in FIG. 1B. Note that, as indicated in the thermogravimetric analysis (TGA) depicted in FIG. 2, heating the precursor to 450° C. and then holding it for 2 hours results in a carbon yield of about 28%. This is in excellent agreement with the macroporous structure and intermediate carbon yield (typically about 25-30%) obtained during the actual low-temperature pyrolysis pre-carbonization step.

Further, the stabilized-carbonized material (FIG. 1B) may, subsequently, be combined (for instance, ground together) with an inorganic base, such as, potassium hydroxide, and annealed at a temperature that is higher than the pyrolyzing temperature. In one embodiment, the stabilized-carbonized material may be annealed at a temperature of about 750° C. to about 950° C. to form the structurally-modified activated carbon material (FIG. 1C) (also referred to herein as "Immense Surface Area Carbons" (ISACs)), having a surface area that is greater than the surface area of the stabilized-carbonized material. In an additional embodiment, higher temperatures may also be used, for example, 1050° C. and beyond, during the annealing process. Note that, in one embodiment, the inorganic base disposed within the stabilized-carbonized material facilitates chemically activating the stabilized-carbonized material during the high-temperature annealing process (also referred to herein as "activation process"). As described further below, in one embodiment, such chemical activation process performed concurrently with the annealing of the stabilized-carbonized material facilitates defining the tunable pore size distribution of the structurally-modified activated carbon material (FIG. 1C). As used herein, the "structurally-modified activated carbon material" refers to an activated carbon material that has been structurally-modified to have an enhanced surface area that is electrochemically active (for instance, as calculated by Brunauer-Emmett-Teller (BET) method) and has a tunable pore size distribution (for instance, as calculated by Non-Local Density Functional Theory (NLDFT)) that can be modulated to have a pore size that includes both microporosity (for example, having a pore size that is less than about 2 nm) and mesoporosity (for example, having a pore size within a range of about 2 nm to about 5 nm). As described further below (see Table 1), in one embodiment, the structurally-modified activated carbon material disclosed herein has been found to have a mesopore volume that is equal to or greater than the micropore volume of a total pore volume of the structurally-modified activated carbon material, owing, for instance, to the two-step fabrication process disclosed herein, namely, the low-temperature pyrolysis process and the high-temperature annealing-activation process.

By way of example, the structurally-modified activated carbon material (ISACs) (FIG. 1C) may have the electrochemically-active surface area of about 4051 $m^2g^{-1}$, and may have a total pore volume of about 2.60 $cm^3g^{-1}$, of which the micropore volume may be within a range of about 1% to about 50%, and the mesopore volume may be within a range of about 50% to about 99%. Advantageously, the electrochemically-active surface area of the structurally-modified activated carbon material (FIG. 1C) has been found to be greater than a surface area of one or more graphene layers (e.g., a single graphene layer has a surface area of 2630 $m^2 g^{-1}$), while the tunable pore size distribution facilitates enhancing energy storage capacity (also referred to herein as "specific capacitance") relative to a corresponding current density. Note that, as one skilled in the art will understand, the surface area of graphene decreases with an increase in the layers of the graphene. By way of example, and in one embodiment, the structurally-modified activated carbon material (ISACs) (FIG. 1C) has been found to exhibit specific capacitance of about 540 $F g^{-1}$ at 0.2 $A g^{-1}$, about 409 $F g^{-1}$ at 1 $A g^{-1}$ and about 226 $F g^{-1}$ at a very high current density of 300 $A g^{-1}$ (~0.15 second charge time). Note that, in one embodiment, and as further confirmed by the experimental data provided below in Table 1, the specific capacitance of the structurally-modified activated carbon material has been found to be a function of the mesopore volume distributed within the structurally-modified activated carbon material. As used herein, the term "function" refers to an increase in the specific capacitance of the structurally-modified activated carbon material with an increase in the volume of the mesoporosity distributed within the structurally-modified activated carbon material.

Still further, in one embodiment, the structurally-modified activated carbon material may be a doped carbon material or an undoped carbon material, depending upon the heteroatom content of the carbon-containing multiphase precursor material. Note that, as the above-mentioned carbon-containing precursor materials may predominantly have heteroatoms, such as, nitrogen, and oxygen, the dopant present in the structurally-modified activated carbon material may have an atomic content of about 0.2 weight % to about 20 weight % of a total weight of the structurally-modified activated carbon material.

Note that, as described further below, various samples of the structurally-modified activated carbon material have been formed by varying the annealing temperatures and/or temperatures of the activation process. For instance, the structurally-modified activation carbon material (ISAC) specimens have been labeled as "ISAC 750", "ISAC 850" and "ISAC 950", depending on the temperature of the activation/annealing process. Note that, although not depicted in the figures, in one embodiment, separate thermogravimetric analysis (TGA) yield measurements after the intermediate stabilized-carbonized material high-temperature activation step of the various ISAC specimens gave a carbon yield of 58% for ISAC 750, 46% for ISAC 850 and 11% for ISAC 950. This suggests that during chemical activation process, the propensity for the carbon to collapse upon itself and undergo extensive gasification as activation temperature increases. Note that, in one embodiment, the combination of surface area and porosity are maximized at an activation temperature of about 850° C.

By way of clarification, FIGS. 5A-5K, 6A-6R & 7A-7I illustrate representative examples of experimental data provided in support of the above discussion, in accordance with one or more aspects of the present invention. Note that, as discussed herein, a commercially purchased advanced electrode-grade activated carbon (e.g., NORIT® SUPRA) was employed as a baseline, and is heretofore referred to as "NORIT". As an additional baseline comparison carbon, a ground precursor-KOH sample was processed identically at 850° C., but without a prior 450° C. stabilization heat treatment.

In one embodiment, FIGS. 3A-3D depict a representative example of a scanning electron microscope (SEM) micrographs of the structurally-modified activated carbon material (e.g., ISAC 750 (FIG. 3A), ISAC 850 (FIG. 3B) and ISAC 950 (FIG. 3C)) relative to that of a standardized commercially-available activated carbon (i.e., NORIT), in accordance with one or more aspects of the present invention. Note that, the overall morphology of ISACs is quite analogous to that of Norit, with relatively dense particulates in the 10-100 micrometer size range. Qualitatively it may be seen that ISAC is actually more homogenous in its particle size distribution than the Norit.

Figure 4B:
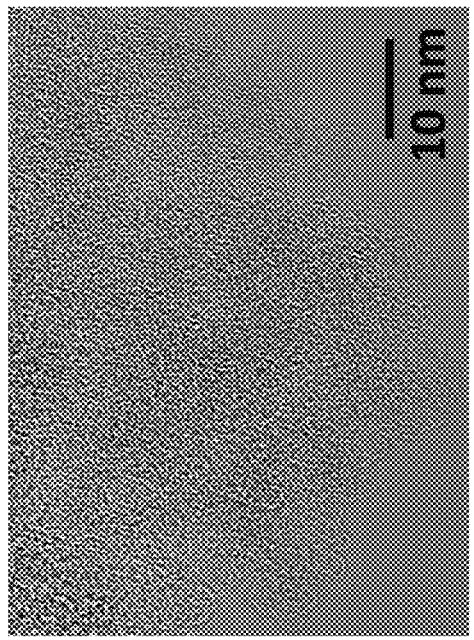
FIGS. 4A-4D depict a representative example of a high-resolution transmission electron micrograph (HRTEM) images of the structurally-modified activated carbon material relative to that of a standardized commercially-available activated carbon, in accordance with one or more aspects of the present invention.
Figure 4D:
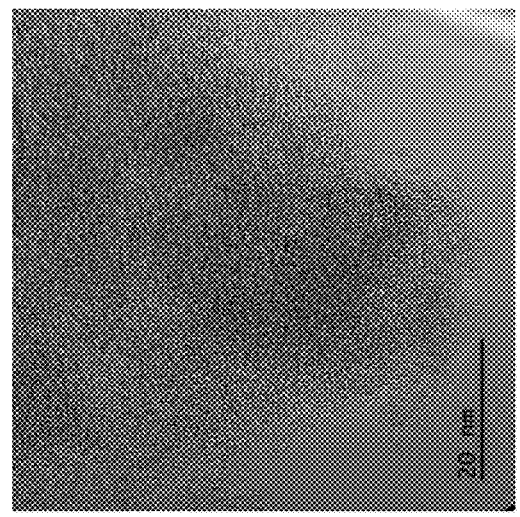
Figure 4A:
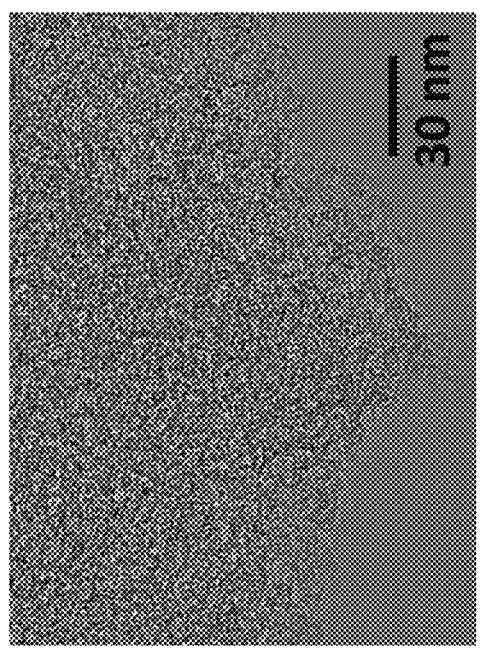
Figure 4C:
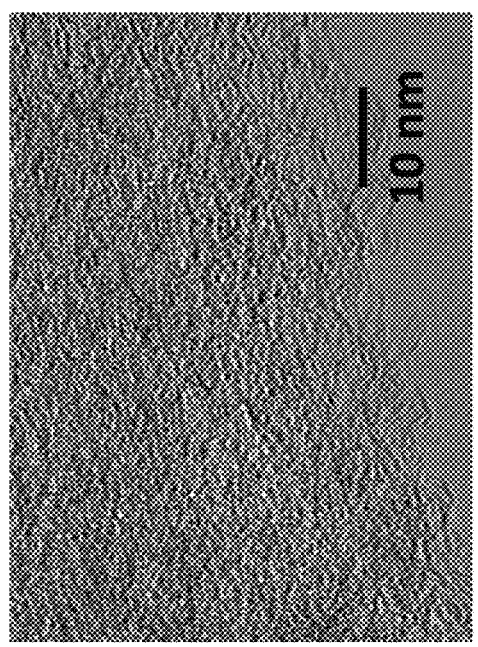

In one embodiment, FIGS. 4A-4C depict a representative example of a high-resolution transmission electron micrograph (HRTEM) images of the structurally-modified activated carbon material (i.e., ISAC 850 (FIGS. 4A and 4B), ISAC 950 (FIG. 4C)) relative to that of a standardized commercially-available activated carbon (i.e., NORIT (FIG. 4D)), in accordance with one or more aspects of the present invention. It may be seen that none of the ISACs are graphitic or highly ordered, which is expected due to the relatively low temperature of pyrolysis-activation, the presence of KOH activating agent, and the lack of aromatic structure in the precursor. The carbons are primarily disordered with contrast synonymous with extensive nanoporosity. As will be demonstrated in the subsequent figures, the primary role of the activation temperature is in affecting the pore size distribution. Note that, as described above in connection with FIGS. 3A-3D relative to those of the FIGS. 1A-1C, and particularly, with regard to FIG. 1B (i.e., the image of the stabilized-carbonized material (450° C.)), it is evident that the high temperature KOH activation also physically breaks up the particles, refining their sizes from a maximum size of over 200 μm down to roughly 25 μm or less.

Figure 5A:
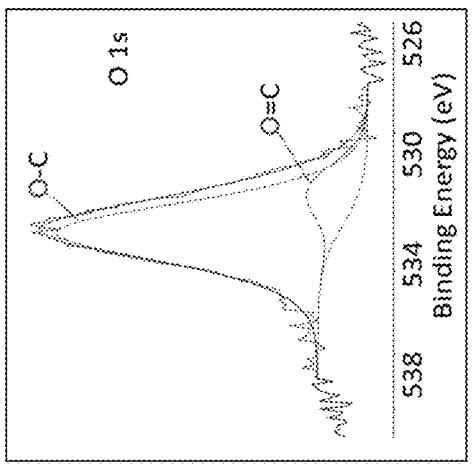

Further, in one embodiment, FIG. 5A depicts a composite of the Raman spectrum plots for structurally-modified activated carbon material (i.e., ISAC 750 (A of FIG. 5A), 850 (B of FIG. 5A), and 950 (C of FIG. 5A), along with that of baseline standardized commercially-available activated carbon (i.e. NORIT) (D of FIG. 5A). The degree of ordering in a carbon is estimated by the intensity ratio between the G band (~1600 cm$^{-1}$) and the D band (1350 cm$^{-1}$) of the Raman spectra. The G band corresponds to the graphitic order, while the D band corresponds to the degree of disordered/defectiveness in the structure. Note that, in one embodiment, the textural, structural and electrochemical properties of the various structurally-modified activated carbon material (i.e., ISAC 750, ISAC 850 and ISAC 950) relative to those of the standardized commercially-available activated carbon (i.e., NORIT) have been summarized below in Table 1. As presented below, all three ISAC carbons show similar $I_D/I_G$ ratio of near 1, confirming that the temperature employed in the activation process does not significantly affect order. The actual $I_D/I_G$ ratios are 1.15 for ISAC 750, 1.05 for ISAC 850 and 0.97 for ISAC 850, with the differences being insignificant. NORIT is also highly disordered, with $I_D/I_G$ being 1.3.

Figure 5B:
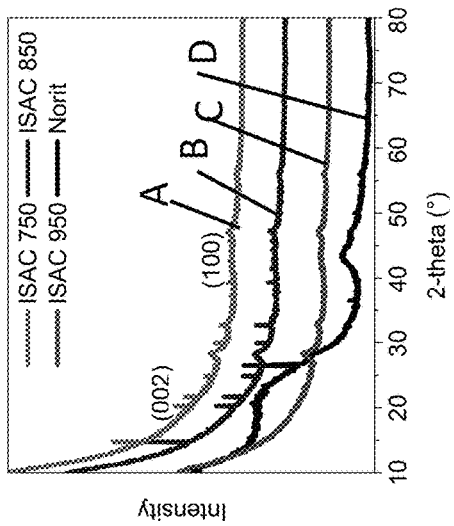
Figure 5C:
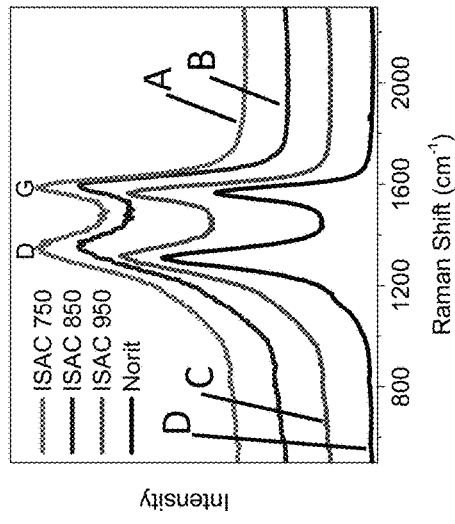

According to the Combustion Elemental Analysis shown in Table 1 (above), and the X-ray photoelectron spectroscopy (XPS) results presented in FIG. 5C, all ISAC carbons (e.g., ISAC 750, ISAC 850 and ISAC 950) are relatively low in heteroatoms. Note that, in one embodiment, FIG. 5C depicts O1s high-resolution XPS spectra of ISAC 850 with peaks at binding energies of 531 eV and 533 eV assigned to C=O and C—O species, respectively. In fact, every ISAC contains less oxygen than the baseline Norit. The primary heteroatoms (referred to herein as "dopants") found in all structurally-modified activated carbon (ISACs) are nitrogen and oxygen. This is what is expected, as precursor is both O and N-rich. However, their overall content is quite low (4.5-2% total), indicating that most O and N is liberated during synthesis. This is a far contrast from the state-of-the-art heteroatom rich carbons from scientific literature that may contain up to 15 wt. % oxygen and/or nitrogen. It is therefore expected that any redox contribution to the specific

TABLE 1

Summary of the textural, structural and electrochemical properties of ISACs.

| Samples | $S_{BET}{}^a$ [m$^2$ g$^{-1}$] | $V_t{}^b$ [cm$^3$ g$^{-1}$] | Pore Volume (%) $V_{micro}{}^c$ | $V_{meso}{}^d$ | $I_D/I_G$ | Composition$^e$ C | N | O | $C_g{}^f$ [F g$^{-1}$] | $C_c{}^G$ [F g$^{-1}$] | $C_r{}^h$ [F g$^{-1}$] |
|---|---|---|---|---|---|---|---|---|---|---|---|
| ISAC 750 | 3708 | 2.11 | 30 | 68 | 1.1 | 96.38% | 0.69% | 2.93% | 426 | 300 | 309 |
| ISAC 850 | 4051 | 2.60 | 22 | 76 | 1.1 | 98.12% | 0.77% | 1.10% | 540 | 304 | 385 |
| ISAC 950 | 3339 | 2.45 | 18 | 79 | 1.0 | 98.44% | 0.68% | 0.89% | 301 | 230 | 256 |
| Norit | 1761 | 0.84 | 60 | 37 | 1.3 | 96.21% | <0.45% | 3.34% | 162 | 90 | 109 |

$^a$Specific Surface Area calculated by Brunauer-Emmett-Teller (BET) method
$^b$Total pore volume calculated by Non-Local Density Functional Theory (NLDFT)
$^c$Micropore volume (<2 nm pore diameter)
$^d$Small mesopore volume (2 nm-10 nm pore diameter)
$^e$Composition (Atomic %) determined by combustion elemental analysis
$^f$Specific Capacitance at current density of 0.2 A g$^{-1}$ in 6M KOH using 3-electrode configuration
$^G$Specific Capacitance at current density of 0.2 A g$^{-1}$ in 6M KOH using symmetrical 2-electrode configuration
$^h$Specific Capacitance at current density of 0.2 A g$^{-1}$ in 1M Li$_2$SO$_4$ using symmetrical 2-electrode configuration FIG. 5B shows the X-ray patterns for the four specimens, namely, the various structurally-modified activated carbon material specimens ISACs (ISAC 750 (A of FIG. 5B), ISAC 850 (B of FIG. 5B) and ISAC 950 (C of FIG. 5B)) and the commercially-available activated carbon (NORIT) (D of FIG. 5B). Note that, the broad (002) and barely discernable (100) diffraction peaks confirm the low degree of order in the carbons. Additionally there is an intense broad peak centered at 2θ~10° for the ISAC specimens. Peaks at similar low angle position, albeit much sharper and with higher relative intensity, have been reported for zeolite-templated carbons. In that case, the peak is clearly associated with the scale of the long-range ordered pore periodicity, which is dictated by the crystalline zeolite template. In the case of ISACs, long-range pore periodicity should not exist. However it may hypothesized that there is some level of quasi-periodicity associated with the micelle-templated pore structure that gives rise to the highly broadened peaks in similar positions. The average periodicity of the pores, which may be may be deduced from Bragg's law: At 2θ=10°, the pores are 8.8 Å apart, far wider than the 3.7 Å spacing of the adjacent defective graphene planes measured by the (002) peak position in activated carbon. The weak highly crystalline peaks in the pattern were identified to be associated small amounts of magnesium formate and magnesium carbonate in the powder. According to inductively coupled plasma analysis, these compounds are present in quantities of <0.088 wt. % (as magnesium). As their fraction is minor and they are not known to be redox active, their presence should not affect the electrochemical response.

capacitance in the ISAC carbons should not be significant. Rather the charge storage behavior is dominated by electrical double layer capacitance (EDLC) of reversibly adsorbed ions on the carbon walls.

Figure 5D:
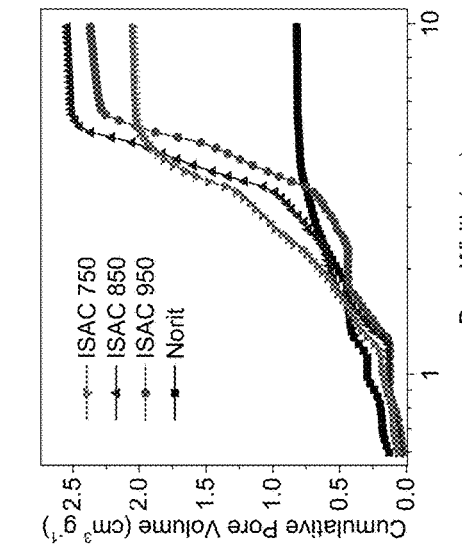
Figure 5E:
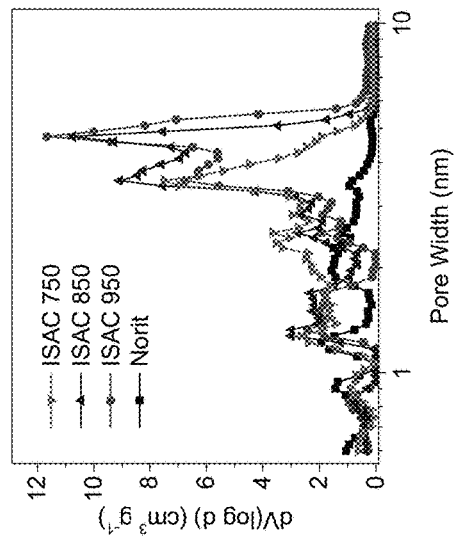
Figure 5F:
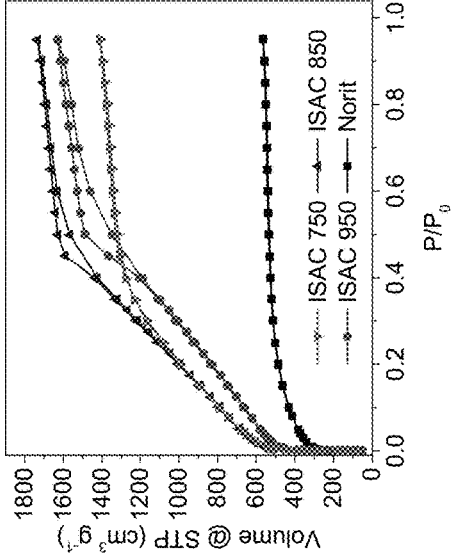

To investigate the textual properties of structurally-modified activated carbon (ISACs), N$_2$ adsorption-desorption isotherms and pore size distribution analyses were performed, as depicted in FIGS. 5D-5K. By way of example, FIG. 5D depicts the nitrogen adsorption-desorption isotherms of ISACs and baseline (i.e., commercially-available activated carbon) NORIT, while FIG. 5E depicts an expanded micropore/small mesopore distribution of pore size distribution of structurally-modified activated carbon (ISACs, i.e., ISAC 750, ISAC 850 and ISAC 950, respectively) and baseline NORIT. Note that, FIG. 5E confirms the enhanced tunable pore size distribution of ISAC relative to that of the baseline NORIT. Further, FIG. 5F depicts expanded cumulative pore volume distribution for ISACs and baseline NORIT, as calculated by Non-Local Density Functional Theory (NLDFT), and confirms the enhanced pore volume distribution of the ISACs relative to that of the baseline NORIT. Still further, FIGS. 5G-5K depict comparison of structurally-modified activated carbon material (ISAC 850) prepared by partial carbonization of precursor followed by separate high temperature carbonization/activation vs. simulated carbonization-activation of carbon-contained precursor. For instance, in one example, while FIG. 5G depicts nitrogen adsorption-desorption isotherms for ISAC (i.e., ISAC 850), an expanded isotherm depicted in FIG. 5F confirms the enhanced tunable pore size distribution of the ISAC obtained using the two-step fabrication process, in accordance with one or more aspects of the present invention. Similarly, FIG. 5I depicts the full scale pore size distributions of the ISAC (i.e., ISAC 850), and an expanded spectrum depicted in FIG. 5J confirms the enhanced pore size distribution of ISAC 850 obtained using the two-step fabrication process disclosed herein. FIG. 5K confirms the full scale cumulative pore volume profile of the ISAC 850 obtained using the two-step fabrication process disclosed herein.

Table 1 also compiles the details of the textural parameters of structurally-modified activated carbon (ISACs) and of the baseline (i.e., commercially-available activated carbon) NORIT. It may be observed that the ISAC carbons possess more than 2× the surface area of the state-of-the-art (i.e., commercially-available activated carbon) NORIT A SUPRA. In fact, the combination of surface area (4051 $m^2g^{-1}$) and pore volume (2.60 $cm^3g^{-1}$) for ISAC 850 are unprecedented, as presented above in Table 1. Note that, no comparable reports in open scientific literature of carbons which such high surface area-pore volume combinations have been found. As discussed, the extremely high surface area and pore volume in these materials may be attributed directly to the stabilization of the micelle structure, which in turn leads to an extremely fine and potentially quasi-periodic attack during the KOH activation process. Note that, as described above in connection with FIGS. 3A-3D, if the 850° C. activation is performed without the 450° C. stabilization step, the resultant surface area is only 531 $m^2$ $g^{-1}$.

As presented, Table 2 compares the textural properties of structurally-modified activated carbon (ISACs) to that of some of the most advanced-highest surface area carbons in literature. The comparison includes a recent highly publicized study on an "ultra-high" surface area carbon derived from PANi aerogel, which was 4073 $m^2g^{-1}$ with a pore volume of 2.26 $cm^3$ $g^{-1}$. Overall, ISAC's pore volume is in fact the highest reported of any carbon. ISAC's surface area is the second highest reported, being number two by a fairly narrow margin of 52 $m^2g^{-1}$. The remaining carbons in the Table 2 are primarily versions of activated graphene, derived from graphene oxide through reducing and activation. Structurally-modified activated carbons (ISACs) are the only carbons in this class of ultrahigh surface area materials that are derived from a biological precursor, making them unique from that vantage as well. The other biological-precursor based carbons always produce much lower surface areas, typically in the 2000 $m^2g^{-1}$ range or less.

TABLE 2

Comparison of the textural properties of ISAC 850 with those of advanced supercapacitor carbons from scientific literature

| Precursor | Carbon Structure | $S_{BET}^a$ [$m^2$ $g^{-1}$] | $V_t^b$ [$cm^3$ $g^{-1}$] | Pore Volume (%) $V_{<2\ nm}$ | $V_{meso}^c$ |
|---|---|---|---|---|---|
| Milk Powder | Activated Carbon | 4051 | 2.60 | 22 | 78 |
| Peat | Activated Carbon (NORIT A SUPRA) | 1721 | 0.79 | 55 | 40 |
| Graphene oxide | Activated microwave-expanded graphene oxide | 3100 | 2.14 | NA | NA |
| PANI | Activated carbon nanofiber | 1976 | 1.25 | 25 | 75 |
| PPy coated carbon nanofibers | N-doped porous carbon nanofibers | 563 | 0.51 | NA | NA |
| Graphene aerogel-SiO$_2$ templated sucrose | 3-D graphene aerogel-based mesoporous carbon | 295 | NA | NA | NA |
| Graphene oxide | Activated reduced graphene oxide paper | 2400 | 1.5 | NA | NA |
| Graphene oxide | Hydrazine-reduced graphene hydrogel | 951 | NA | NA | NA |
| Graphene oxide | Crumpled N-doped graphene nanosheets | 465 | 3.42 | NA | NA |
| Pluronic-templated dicyandiamide-resol copolymer | N-doped ordered mesoporous carbon | 1417 | 0.91 | NA | NA |
| Graphene oxide | Activated microwave-expanded graphene oxide spheres | 3290 | NA | NA | NA |
| Egg white | Hierarchical mesoporous carbon | 806 | NA | NA | >90 |
| Phenol + Formaldehyde + Graphene Oxide | 3D-porous graphene-based material | 3523 | 2.13 | 27 | 73 |
| Lignin + Graphene Oxide | 3D-porous graphene-based material | 3026 | 2.40 | 18 | 82 |
| Zeolitic imidazolate framework | Microporous MOF carbon | 1110 | 0.62 | 65 | 35 |
| Magnesium oxide templated benzene | Carbon nanocage | 2053 | NA | NA | NA |
| Hemp | Carbon nanosheets | 2287 | 1.45 | 56 | 44 |
| PANI-phytic acid polymer | 3D hierarchical porous graphitic carbon | 4073 | 2.26 | NA | NA |

TABLE 2-continued

Comparison of the textural properties of ISAC 850 with those of advanced supercapacitor carbons from scientific literature

| Precursor | Carbon Structure | $S_{BET}{}^a$ [m$^2$ g$^{-1}$] | $V_t{}^b$ [cm$^3$ g$^{-1}$] | Pore Volume (%) | |
|---|---|---|---|---|---|
| | | | | $V_{<2\,nm}$ | $V_{meso}{}^c$ |
| Egg white | Heteroatom-rich activated carbon | 1406 | 0.73 | 86 | 14 |
| Dead leaves | Microporous carbon | 1230 | NA | NA | NA |

[a]Specific Surface Area calculated by Brunauer-Emmett-Teller (BET) method
[b]Total pore volume calculated by Non-Local Density Functional Theory (NLDFT)
[c]Mesopore volume (2 nm-50 nm)

Note that, in one embodiment, the surface area numbers of the structurally-modified activated carbon (ISACs) disclosed herein have been confirmed multiple times. For instance, there were at over twenty separate BET/pore distribution experiments there were performed on the ISACs disclosed herein, with each one being synthesized in a separate batch. The repeatability of the measurements has been confirmed in each instance.

The porous texture of structurally-modified activated carbon material (ISAC) was analyzed by N$_2$-adsorption at 77K. As described above, FIG. 5D further shows that all the ISAC 750 and Norit exhibit type IV isotherms with well-defined plateaus indicating a typical character of microporous-mesoporous materials. The broadening of the knee at P/P$_o$~0.4 is characteristic of the presence of small mesopores, while the pronounced type H2 hysteresis loop for ISAC 850 and ISAC 950 indicates the presence of abundant larger mesopores as well. Significant mesoporosity will be critically important in rationalizing the superior rate capability of all three ISAC carbons. Judging from the data, it appears that there is a volcano type behavior for optimizing the surface area in these carbons. Going from 750° C. to 850° C., activation improves the total surface area and mesopore/micropore ratio, presumably due to increased aggressiveness of the KOH attack. However, further increasing the activation temperature to 950° C. actually decreases the overall surface area, total volume, and percentage of micropores. This is attributed to the elevated temperature promoting collapse of the finest pores, their sintering and significant generation of volatile species (supported by the substantial reduction in yield at 950° C.), and/or Ostwald Ripening, resulting in the elimination of the majority of sub-2 nm structures that are expected to be the least energetically stable.

Electrochemical Properties of Structurally-modified Activated Carbons (ISACs)

A range of electroanalytical techniques were employed to characterize the performance of the structurally-modified activated carbon (ISAC) specimens disclosed herein, including three-electrode and two-electrode testing. Two types of aqueous electrolytes were employed, a basic 6M KOH with a window of 1.0 V (FIGS. 6A-6R), and a neutral 1M Li$_2$SO$_4$ with a window of 1.8 V (FIGS. 7A-7I). As neutral electrolytes suppress oxygen and hydrogen evolution, a wider allowable voltage window is possible with Li$_2$SO$_4$ or Na$_2$SO$_4$ versus standard base or acid aqueous systems. As a baseline, commercially-available activated carbon (NORIT A SUPRA) was also identically tested.

Figure 6A:
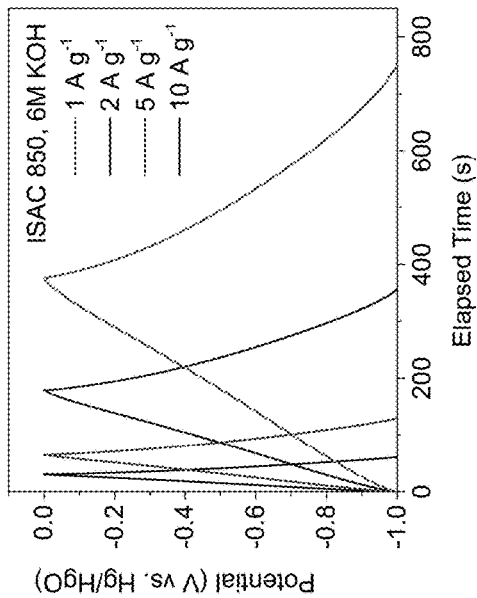
FIGS. 6A-6R depict representative examples of electrochemical properties in three-electrode configuration (i.e., FIGS. 6A-6I) and two-electrode configuration (FIGS. 6J-6R), respectively, that has been tested in 6M KOH electrolyte with a 1.0V window, in accordance with one or more aspects of the present invention.
Figure 6B:
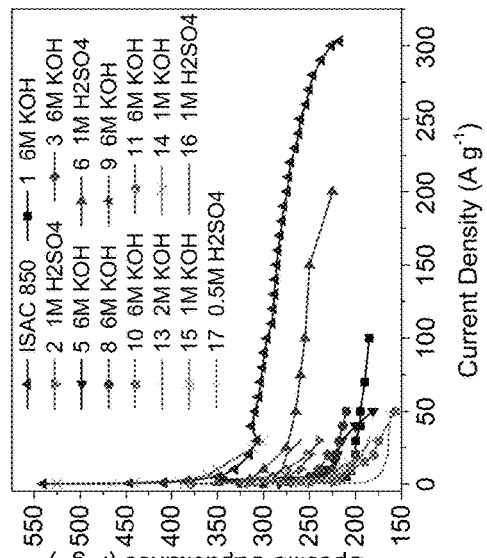
Figure 6C:
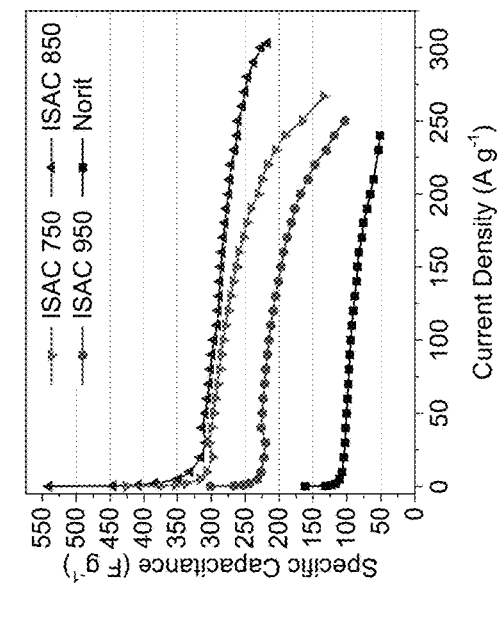
Figure 6D:
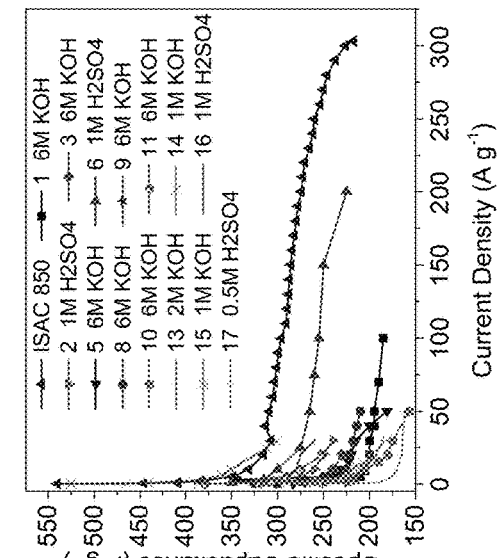
Figure 6K:
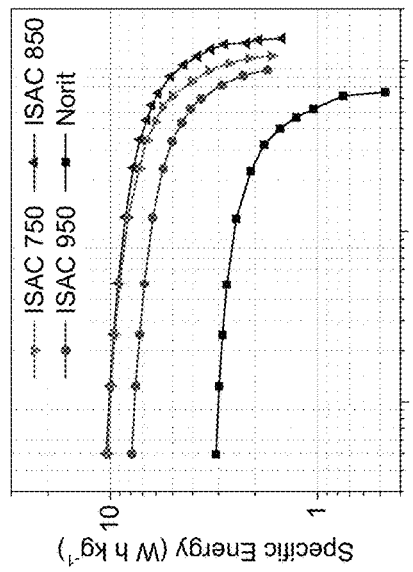
Figure 6M:
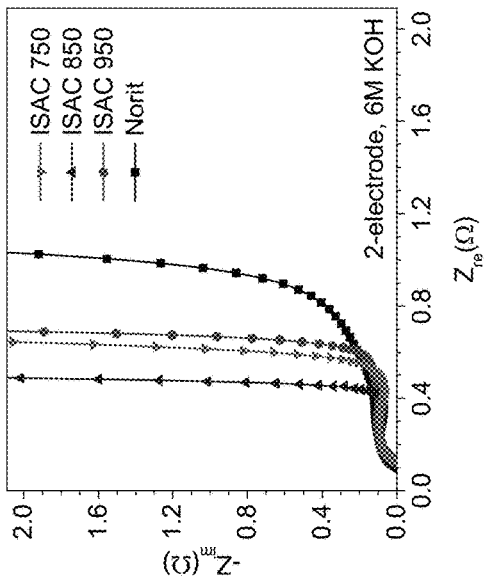
Figure 6J:
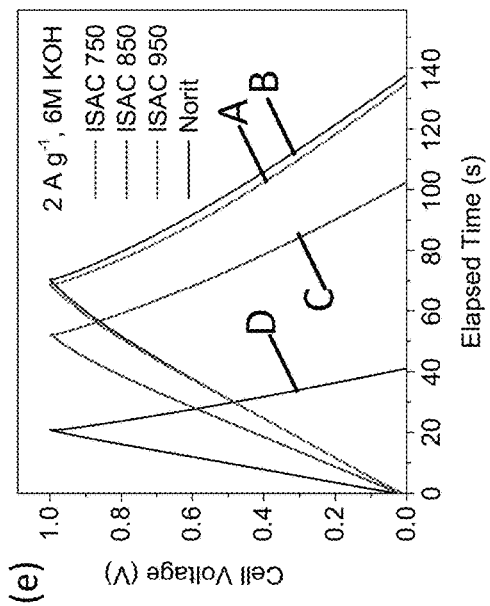
Figure 6L:
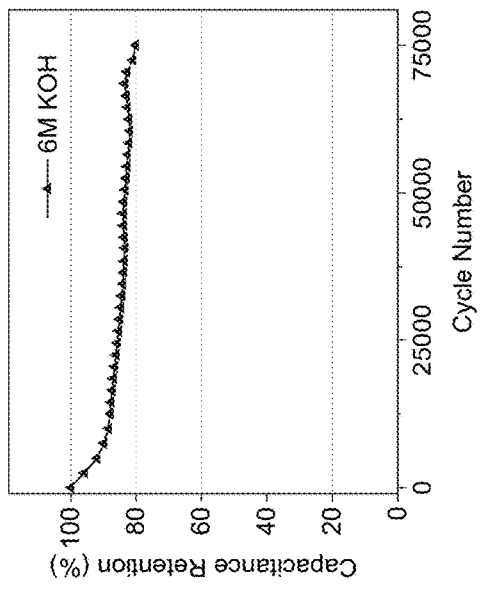
Figure 6N:
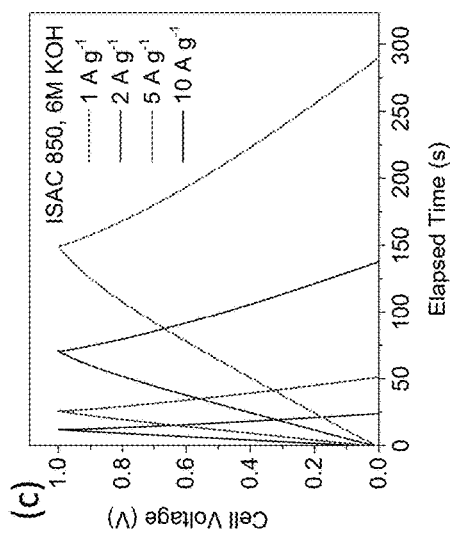
Figure 6O:
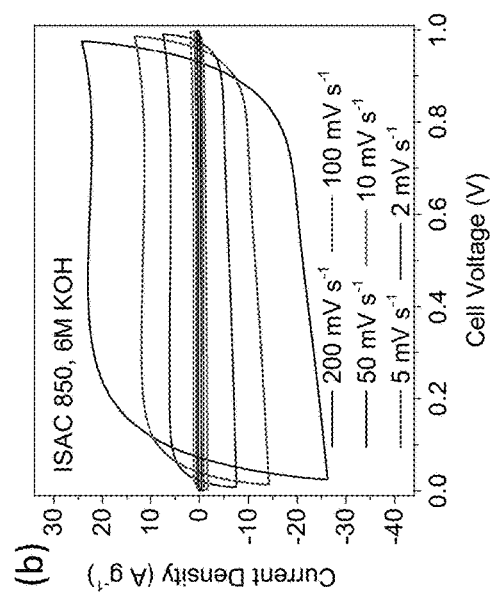
Figure 6P:
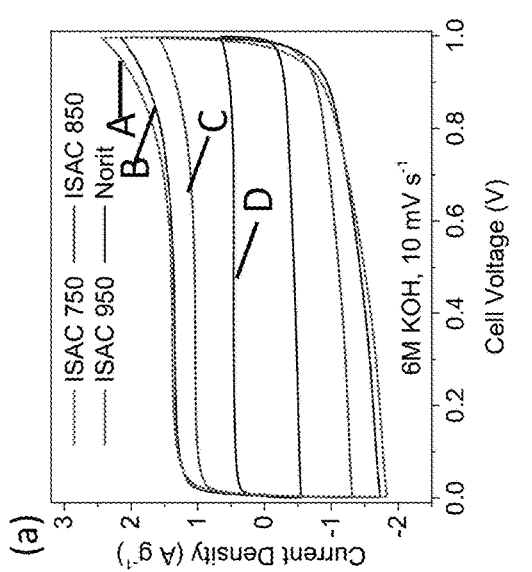
Figure 6Q:
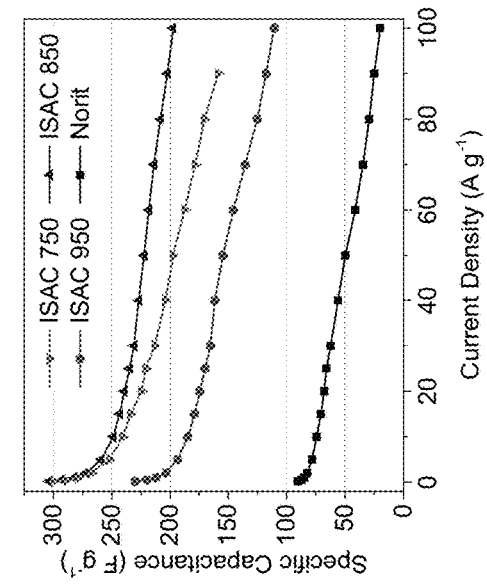
Figure 6R:
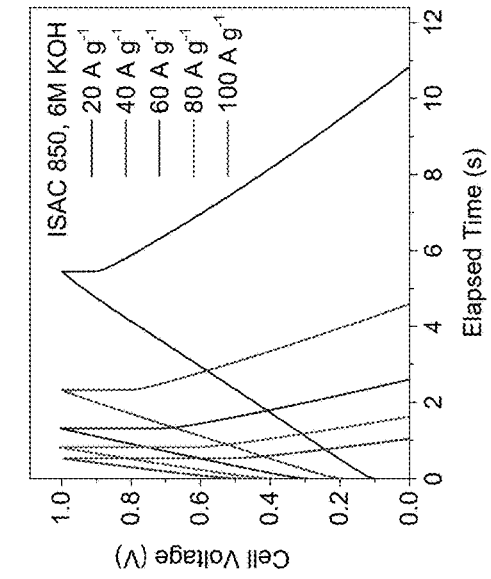

By way of example, cyclic voltammetry was carried out employing a three-electrode setup in an electrolyte of 6 M KOH at room temperature, as depicted in FIGS. 6A-6R. FIG. 6A shows the cyclic voltammetry (CV) curves of ISACs at a scan rate of 10 mV s$^{-1}$. The specific capacitance of ISACs (e.g., ISAC 750 (A of FIG. 6A), ISAC 850 (B of FIG. 6A) and ISAC 950 (C of FIG. 6A) is substantially superior to Norit (D of FIG. 6A). ISACs possess ultra-high surface area with little redox-active heteroatom content. Thus, there is a huge electrical double-layer contribution (EDLC) but a minimal pseudocapacitive faradaic response. It can be observed that the CV curves for all ISACs display a quasi-rectangular shape that is expected for conducting EDLC carbons. FIG. 6E shows the CV curves for ISAC 850, presented at the different scan rates. The rates range from 5 to 200 mV s$^{-1}$, the latter being a 5 second charge or discharge. It may be observed that even at 200 mV s$^{-1}$, the CV for ISAC 850 remains fairly rectangular. This indicates excellent resistance to ion-in-pore diffusional losses, and may be straight forwardly attributed to the mesopore content in the carbon. ISAC 850 contains 76% mesopores (2 nm-10 nm diameter) by volume, i.e. 1.98 cm$^3$ g$^{-1}$ of mesoporosity.

FIG. 6B gives the three-electrode galvanostatic charge-discharge profiles of ISAC 850 at various current densities. It may be observed that even at high currents, such as 10 A g$^{-1}$, the charge—discharge curves are symmetric in terms of the time to charge vs. the time to discharge. Moreover, the curves demonstrate low IR drops during the discharge. The symmetry indicates excellent Coulombic efficiency, which the low IR drops indicate minimal diffusional or electrical resistance losses. FIG. 6F compares the galvanostatic data for structurally-modified activated carbon (ISAC) (e.g., ISAC 750 (A), ISAC 850 (B) and ISAC 950 (C)) and for the baseline, (i.e., commercially-available activated carbon) Norit (D), at a current density of 2 A g$^{-1}$. The charge storage capacity of the ISACs is far higher than that of Norit, as indicated by the much longer time to charge at the same current. This may be directly attributed to more than twice the surface area of ISACs, combined with substantially lower diffusional limitations due to much higher fraction of mesopores.

FIG. 6C shows the three-electrode rate capability of all three ISACs and that of the baseline (i.e., commercially-available activated carbon) Norit. FIG. 6D compares the rate capability comparison of ISAC 850 with advanced carbons from literature. FIG. 6G shows a magnified view of the low current density specific capacitance values for structurally-modified activated carbon (ISACs) and baseline commercially-available activated carbon (Norit) (same data as FIG. 6D). Note that, as depicted in FIG. 6G, at 0.2 A g$^{-1}$, a specific capacitance of 426, 540, 301 and 162 F g$^{-1}$ are obtained for ISAC 750 (A), ISAC 850 (B), ISAC 950 (C), and Norit (D), respectively. At 0.5 A g$^{-1}$, these values are 374, 446, 266 and 132 F g$^{-1}$, respectively. As evident from FIG. 6G, ISAC 850 (B), with its optimized surface area—pore volume—mesoporosity combination yields the best overall results. Note that, as indicated in FIG. 6D, even at the extreme 250 A g$^{-1}$ the specific capacitance of ISAC 850 will still be formidable at 260 F g$^{-1}$. Note also that, such combination of specific capacitance and rate capability has previously never been achieved in a conventional carbon. What is equally remarkable is that such specific capacitance values are achieved primarily by EDLC charge storage. As indicated in FIG. 6D, the overall rate performance of ISAC 850 is quite favorable as compared previously published pure or heteroatom doped carbons. In general, performance at 250 A g$^{-1}$ or 300 A g$^{-1}$ is not reported in literature period.

To simulate behavior of structurally-modified activated carbon (ISACs) in actual devices, electrochemical performance has been evaluated in a symmetrical two-electrode cell setup. FIGS. 6J-6R display the electrochemical properties in a symmetrical two-electrode cells, tested in 6M KOH electrolyte with a 1.0 V window. FIG. 6J shows a comparison of the galvanostatic curves for ISACs (i.e., ISAC 750 (A), ISAC 850 (B) & ISAC 950 (C)) and Norit (D) at 2 A g$^{-1}$. Akin to the three electrode data, the galvanostatic results demonstrate ISACs 850 and 750 to be the overall most favorable performers. FIG. 6N shows a comparison of the CV curves for ISACs (i.e., ISAC 750 (A), ISAC 850 (B) & ISAC 950 (C)) and Norit (D) at 10 mV s$^{-1}$, again clearly demonstrating the superior charge storage capability of ISACs. FIG. 6O shows the CV profiles of ISAC 850 at various scan rates. FIGS. 6P & 6Q show the galvanostatic data of ISAC 850 at various current densities. As shown in FIG. 6P, the rate capability of ISAC 750 is inferior to that of ISAC 850, which is due to its lower mesopore content. FIG. 6K shows the Ragone chart for the three ISACs and for Norit when tested in KOH. At every power value tested, the specific energy of ISACs is more than twice of Norit, fully agreeing with the trends in the specific capacitance rate data. Even with the narrow 1.0 V window necessitated by KOH, the specific energy of ISAC 850 is solid, being in the 10 Wh kg$^{-1}$ range (by active mass) at intermediate powers.

FIG. 6L shows the capacitance retention data, tested to 75,000 cycles at a rate of 25 A g$^{-1}$, with the initial $C_c$=247 F g$^{-1}$. It is quite uncommon to be able to cycle a carbon or an oxide in such a basic electrolyte (6M KOH) over twenty thousand times without significant degradation. However, in one embodiment, 75,000 charge-discharge cycles with 80% capacitance retention were achieved. This confirms an essential advantage of employing a high performance carbon that works primarily by EDLC; one does not have to worry about the redox active surface functional groups being corroded away or inactivated by repeated anodic-cathodic cycling.

Electrochemical impedance spectroscopy (EIS) was employed to further investigate the electrochemical performance if ISACs in a two electrode configuration. Tests were performed both in KOH and Li$_2$SO$_4$. The KOH results are shown in FIG. 6M. EIS demonstrates that all ISACs possess somewhat lower charge transfer resistances as compared to commercial Norit. For activated carbons employed for supercapacitor applications, differences in the charge transfer resistances have been attributed to pore tortuosity. Overall the values for charge transfer resistance ($R_{ct}$) as tested in 6M KOH are all low: The values are 0.294Ω for ISAC 750, 0.267Ω for ISAC 850, 0.362Ω for ISAC 950, and 0.342Ω for Norit, indicating the excellent electrolyte wettability on the carbon surfaces. The onset frequency ($\square_{onset}$) is defined as the highest frequency where the impedance of electrode is dominated by capacitive behavior, i.e. the Nyquist plot is vertical. It reflects the transition from capacitive behavior to diffusion-controlled processes, with higher frequency values being desired. As indicated in Table 3, the onset frequency of ISACs increases in the same order as their mesopore content.

TABLE 3

Electrochemical impedance spectroscopy analysis obtained from 6M KOH and 1M Li$_2$SO$_4$ electrolyte, symmetrical two-electrode configurations

| Samples | $R_{ohm}^a$ (Ω) | $R_{ct}^b$ (Ω) | $R_{diff}^c$ (Ω) | ESR$^d$ (Ω) | $v_{onset}^e$ (Hz) |
|---|---|---|---|---|---|
| 2-Electrode EIS in 6M KOH | | | | | |
| ISAC 750 | 0.126 | 0.294 | 0.092 | 0.512 | 3.971 |
| ISAC 850 | 0.091 | 0.267 | 0.051 | 0.409 | 5.000 |
| ISAC 950 | 0.117 | 0.362 | 0.080 | 0.558 | 3.971 |
| Norit | 0.123 | 0.342 | 0.292 | 0.757 | 3.154 |
| 2-Electrode EIS in 1M Li$_2$SO$_4$ | | | | | |
| ISAC 750 | 0.714 | 2.391 | 0.739 | 3.844 | 0.500 |
| ISAC 850 | 0.465 | 1.702 | 0.655 | 2.822 | 0.792 |
| ISAC 950 | 0.623 | 2.547 | 0.751 | 3.921 | 0.792 |
| Norit | 0.425 | 5.475 | 9.618 | 15.518 | 0.199 |

$^a$Ohmic resistance
$^b$Charge transfer resistance
$^c$Warburg impedance
$^d$Equivalent series resistance
$^e$Onset frequency The onset frequency for ISAC 750, ISAC 850, ISAC 950 is 3.971 Hz, 5.000 Hz, and 3.971 Hz respectively. Due to the lower mesopore fraction in Norit, its $\square_{onset}$ substantially lower at 3.154 Hz. The carbons' equivalent series resistance ($R_{es}$) may be directly obtained from the Nyquist plot as well. $R_{es}$ is the sum of its ohmic resistance (highest frequency intercept of abscissa), its charge transfer resistance (diameter of the semicircle) and its diffusional resistance (length of the Warburg line). $R_{es}$ may be obtained by extrapolating the pure capacitive portion of the Nyquist plot down to the abscissa, which effectively winds up being the resistance at the onset frequency. For the comparison of ISACs with Norit, $R_{es}$ is highly useful as its differences stem mostly from the variation in ion diffusional resistance within the pores. The ISACs all possess comparable $R_{es}$, which are in the 0.4-0.6 Ohm range, whereas Norit is higher at 0.8 Ohms.

Figure 7A:
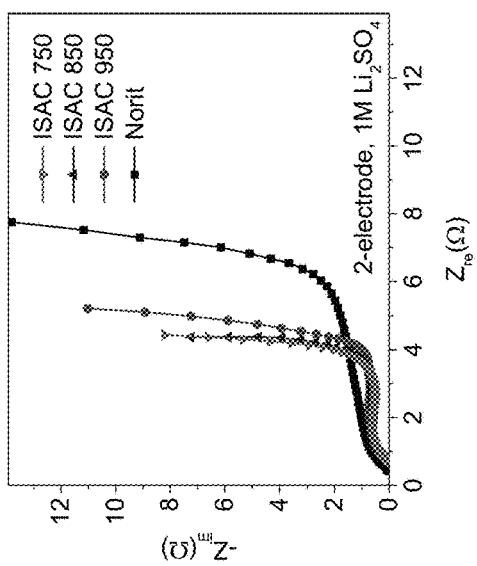
FIGS. 7A-7I depict representative examples of electrochemical properties in two-electrode configuration that has been tested in 1M $Li_2SO_4$ electrolyte with 1.8V window, in accordance with an aspect of the present invention.
Figure 7B:
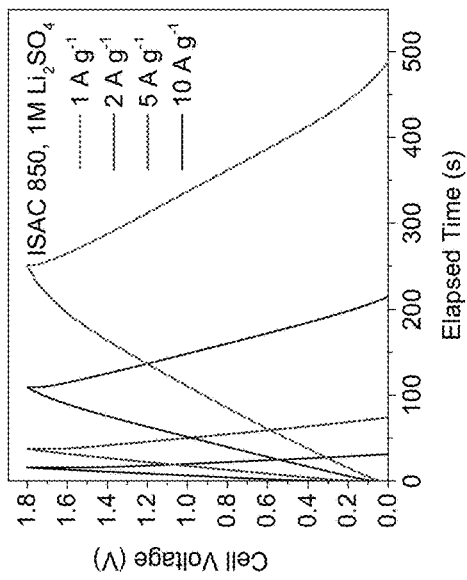
Figure 7C:
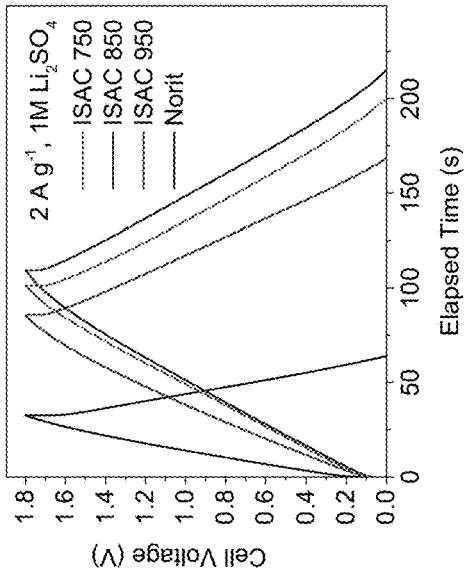
Figure 7D:
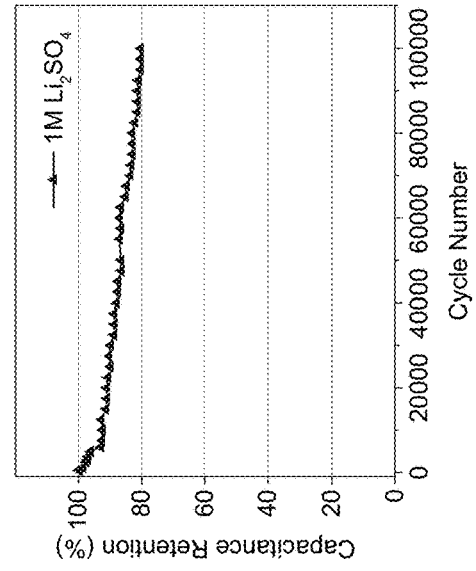
Figure 7E:
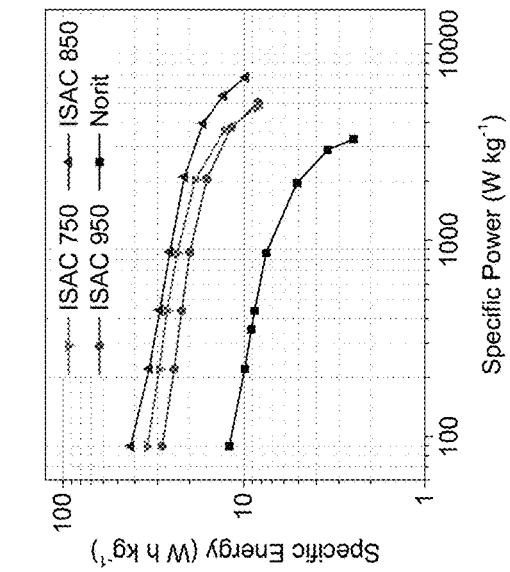
Figure 7F:
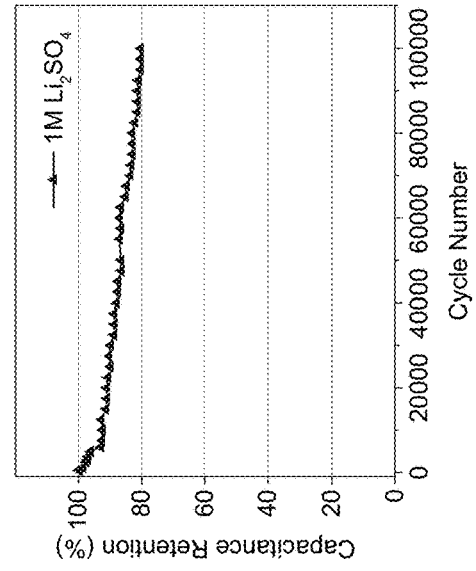
Figures 7G, 7H, 7I:
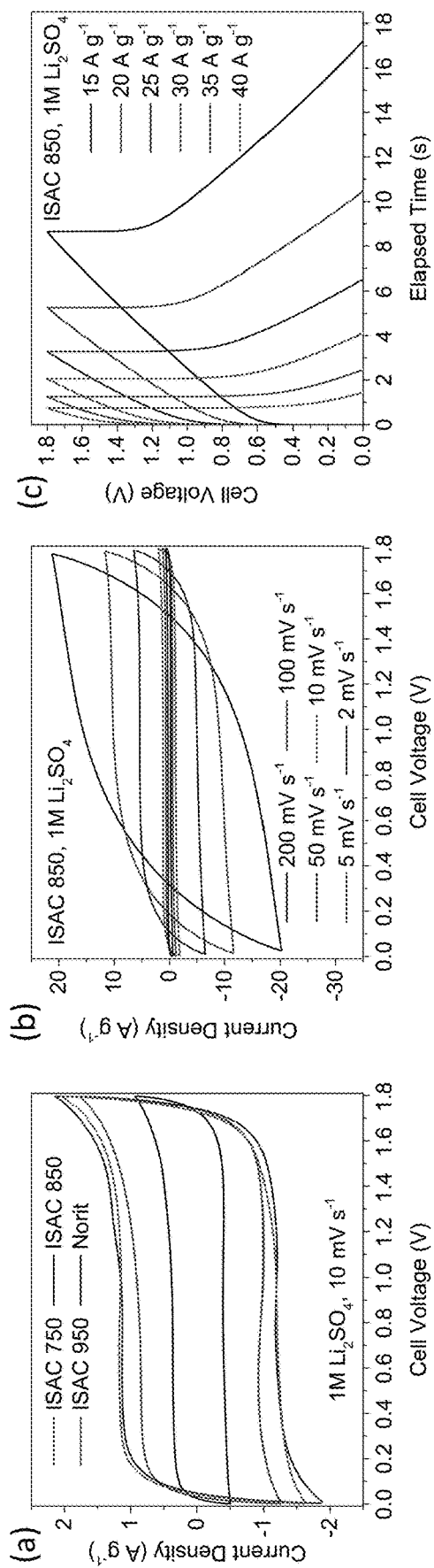

FIGS. 7A-7I show the electrochemical properties of a symmetrical two-electrode cell tested in 1M Li$_2$SO$_4$ electrolyte and a stable 1.8V window. FIG. 7G shows the CVs of ISACs and Norit, tested as a scan rate of 10 mV s$^{-1}$. FIG. 7H shows the CV curves of ISAC 850 through a range of scan rates, including the very fast 200 mV s$^{-1}$. FIG. 7A provides a comparison of the galvanostatic curves for ISACs and Norit, tested at 2 A g$^{-1}$, while FIG. 7B shows ISAC 850 at various current densities. FIG. 7C demonstrates the Nyquist plots of ISACs and Norit tested over a frequency range of 50 kHz-25 mHz (for instance, at 10 mV RMS amplitude and 5 mV s$^{-1}$ scan rate), and as presented in Table 3. The CV, galvanostatic and EIS trends are quite analogous to what was measured with KOH: While all ISACs are substantially superior to Norit, the 850 carbons demonstrate the optimum combination of electrochemically active surface area and mesoporosity, leading to the overall most favorable capacitance values at all rates. The Li$_2$SO$_4$ EIS results show comparable behavior to KOH: Overall the values for charge transfer resistance ($R_{ct}$) are 2.391Ω for ISAC 750, 1.702Ω for ISAC 850, 2.547Ω for ISAC 950, and 5.475Ω for Norit, indicating suggesting a reduced electrolyte wettability on the carbon surfaces. Again from Table 3, the onset frequency of ISACs increases in the same order as their mesopore content. The onset frequency for ISAC 750, ISAC 850, and ISAC 950 is 0.500 Hz, 0.792 Hz, and 0.792 Hz respectively. Due to the lower mesopore fraction in Norit, its $\square_{onset}$ substantially lower at 0.199 Hz. The ISACs all possess comparable $R_{es}$ in 1M $Li_2SO_4$, which are in the 3-4 Ohm range, whereas Norit is substantially higher at >15 Ohms. As FIG. 6M demonstrates the fraction of capacitance retention with increasing charge rate is analogous for ISAC 850 and ISAC 950. This is expected as both materials possess extensive mesoporosity, at higher relative fractions than ISAC 750 or Norit. However since the total electrochemically active surface area of ISAC 850 is the highest, so is the overall capacity at each scan rate. Comparing ISAC 850 and ISAC 750 illustrates the utility of micropores even at extremely high scan rates, as long as there is sufficient mesoporosity to allow facile ion access. FIG. 7E shows the Ragone chart data. With the 1.8V window, the energy density of symmetric supercapacitor cells employing ISACs are very favorable. ISAC 850 in particular demonstrates the best energy values through the entire power spectrum. Because of the pore structure, it is able to operate at much higher specific powers than Norit, surpassing 8 kW $kg^{-1}$ by active mass. At intermediate power values, energies of 30-40 Wh $kg^{-1}$ are achieved, making the system competitive with hybrid supercapacitors with an oxide cathode. When near commercial mass loadings, a denominator of 4 may be used to extrapolate the energy-power density of a device (considering all components of the packaged cell). Thus the estimated energy density of our device is 8-10 Wh $kg^{-1}$. That is on par with what is listed for state-of-the-art commercial organic electrolyte cells, which are 6-7 Wh $kg^{-1}$ for battery type cells. An ISAC 850 based $Li_2SO_4$ cell also shows cyclability that is truly exceptional. As FIG. 7F illustrates, 100,000 full charge discharge cycles with 80% capacity retention were acheived. The cell was cycled at 15 A $g^{-1}$ with an initial $C_c$=177 F $g^{-1}$. Such stability would be impossible to achieve in a redox active heteroatom-rich or otherwise surface functionalized carbon.

Material Synthesis

The precursor, non-fat powdered milk was purchased commercially and employed in the as-received condition. To stabilize and preserve the intermediate 3-D structure (described in main text) the precursor underwent a low temperature partial pyrolysis treatment at 450° C. for two hours, in a horizontal tube furnace under inert flowing argon. The resultant carbon was ground together with KOH (85% pure, balance water) in a ratio of 1 part carbon to 3 parts active KOH. The blend then underwent a heat treatment of 750° C., 850° C., or 950° C. for two hours under argon. The final activated product, Immense Surface Area Carbon (ISAC), was obtained by cleaning through acidification of the caustic product through three successive steps in 6M HCl, each time followed by vacuum filtration. A final rinse with deionized water was completed in triplicate in the same manner, followed by drying at 110° C. in a convection oven overnight. The specimens are labeled "ISAC 750", "ISAC 850" and "ISAC 950", depending on the temperature of the activation process. A commercially purchased advanced electrode-grade activated carbon (NORIT® A SUPRA) was employed as a baseline, and is heretofore referred to as "Norit". As an additional baseline comparison carbon, a ground precursor-KOH sample was processed identically at 850° C. but without a prior 450° C. stabilization heat treatment.

Material Characterization

The morphology and structure of the porous carbon materials were examined by scanning electron microscopy and transmission electron microscopy. Nitrogen adsorption and desorption isotherms were measured with a Quantachrome Autosorb IQ automated gas sorption analyzer at 77K. Surface area results were determined using the Brunauer-Emmett-Teller (BET) method. The pore size distribution plots were obtained based on the non-local density functional theory (NLDFT) using nitrogen adsorption data and slit micropore/cylindrical mesopore geometry model. Powder X-ray diffraction (XRD) was performed on a Bruker D2 Phaser x-ray diffraction instrument with Cu Kα radiation.

Electrochemical Evaluation

The electrochemical performance of ISAC carbons were investigated using a 3-electrode cell configuration and device performance was characterized in a 2-electrode symmetric cell configuration. Working electrodes for both the 2-electrode and 3-electrode cells were prepared by making a slurry of 80% active material, 10% carbon black (Super P) and 10% PVDF binder in N-methylpyrrolidone (NMP) solvent. The slurry was drop cast onto the nickel foam and then dried at 110° C. overnight in a convection oven. Each working electrode had a mass loading of approximately 10 mg $cm^{-2}$. In 3-electrode configuration, the working electrodes were tested with graphite rod counter electrodes and Hg/HgO reference electrodes in 6M KOH electrolyte. For electrochemical analyses in the symmetric cell, two electrodes were placed face-to-face and tested in 6M KOH or 1M $Li_2SO_4$. Electrochemical impedance spectroscopy (EIS) in a three electrode configuration was carried out over a frequency range of 50 kHz-25 mHz with a voltage amplitude of 10 mV RMS. Cyclic voltammetry, galvanostatic charge/discharge cycling, and impedance analysis were all performed using Versastat 3 and Versastat 4 single channel potentiostats, as well as Parstat MC (eight channel chassis) potentiostats from Princeton Applied Research.

The galvanostatic specific capacitance $C_g$ (F $g^{-1}$) was determined according to $$C_g = \frac{I}{(dV/dt)m}$$

where I is the current (A), dV/dt is the slope of the discharge curve (V $s^{-1}$) excluding the IR drop region, and m is the active mass in the electrode. For the two-electrode system, the cell capacitance (C, (F $g^{-1}$)) was calculated likewise, except that m is the combined active mass in both electrodes. The specific energy (E, Wh $kg^{-1}$) and specific power (P, W $kg^{-1}$) values were calculated from the galvanostatic data of the two electrode cell, with the voltage windows used in the calculation accounting for the IR drops.

In an enhanced embodiment, the structurally-modified activated carbon materials (ISACs) disclosed herein may be utilized in a variety of energy-storage devices, such as, a combined battery-supercapacitor energy storage device (also called supercapattery or batpacitor), and an ion energy storage device, as an anode (e.g., in a half-cell), a cathode (e.g., in a half-cell) or both (in a full-cell). By way of example, the structurally-modified activated carbon materials may be used as electrodes, such as, for instance, an anode, a cathode, as any other supporting material (i.e., secondary addition), etc., for use, for instance, with a variety of energy storage applications, such as, battery, supercapacitor, batpacitor and the like.

In yet another embodiment, the structurally-modified activated carbon materials (ISACs) may be used in any device employing standard or research-grade secondary or primary battery or supercapacitor or combination of thereof utilizing electrolytes, such as, organic electrolytes (e.g., ethylene carbonate, (EC), diethyl carbonate (DEC), dimethyl carbonate (DMC), acetonitrile ($CH_3CN$), propylene carbonate, tetrahydrofuran, γ-butyrolactone, and solutions with quaternary ammonium salts or alkyl ammonium salts, such as, tetraethylammonium tetrafluoroborate), ionic liquid electrolytes, aqueous electrolytes (e.g., aqueous KOH, aqueous $H_2SO_4$, $Li_2SO_4$, $Na_2SO_4$) and the like. By way of example, in such energy storage devices, the structurally-modified activated carbon material may be undoped carbon material. Further, the structurally-modified activated carbon materials (ISACs) may be utilized in any of the energy storage devices that employ charge transfer ions, such as, ions of lithium (Li), sodium (Na), potassium (K), calcium (Ca), magnesium (Mg), aluminum (Al), hydrogen (H), hydroxide (OH), any of the associated negative counter ions, such as, $ClO_4^-$, $PF_6^-$ or any combinations of thereof. In some embodiments, the energy storage device employs only ions in the electrolyte and/or metal source added to one or both electrodes.

In yet another embodiment, the structurally-modified activated carbon materials (ISACs) disclosed herein may be utilized in a variety of energy-storage devices, for instance, as an anode, where the cathode may be selected from a group consisting of a lithium iron phosphate (LFP), a nickel cobalt aluminum (NCA), a nickel manganese cobalt (NMC), a lithium cobalt oxide (LCO), and a ceramic positive electrode. Alternatively, the structurally-modified activated carbon materials (ISACs) disclosed herein may also be used a cathode, where the anode may be selected from a group consisting of an oxide-based anode, a lithiated tin anode, a lithium metal anode, a sulfur-based anode, a selenium anode, a graphite anode, an activated carbon anode, a graphene anode, a silicon anode, a tin anode, an alloy anode, an oxide anode, a sulfide anode, a nitride anode, and a negative electrode.

Still further, the structurally-modified activated carbon materials (ISACs) disclosed herein may be utilized in a energy-storage device, such as, electrochemical capacitor, primary or secondary battery, a flow battery, a dionization capacitor, a supercapattery, and other energy storage system based on ions that are reversibly or irreversibly stored at a positive electrode and a negative electrode, having a housing that conforms to standardized battery dimensions. In a one example, the standardized battery dimensions may be, or may include, for instance, cylindrical cells of 18.6 diameter× 65.2 length, prismatic pouch cells of a range of sizes, automotive lead-acid battery scale cells that are rectangular, D-cell dimensions such as, 32.5×61.5 mm, etc. By way of example, the batpacitor may be disposed in the housing and electrically coupled to the housing. The housing may include a form factor of a pouch cell battery, a rectangular automotive started battery scale cell, D-cell sized battery, a C-cell sized battery, an AA-cell sized battery, an AAA-cell sized battery, a 18650 lithium ion battery, or a 26650 lithium ion battery, such that the energy storage device may take the form of a commercial battery.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as, "has" and "having"), "include" (and any form of include, such as "includes" and "including"), and "contain" (any form of contain, such as "contains" and "containing") are open-ended linking verbs. As a result, a method or device that "comprises", "has", "includes" or "contains" one or more steps or elements. Likewise, a step of method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts and equivalents of all means or step plus function elements in the claims below, if any, are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the present invention for various embodiments with various modifications as are suited to the particular use contemplated.

What is claimed is:

1. An electrode of an energy storage device, the electrode comprising:
a structurally-modified activated carbon material derived from a carbon containing material having a heterogeneous micelle-stabilized structure, the structurally-modified activated carbon material comprising a tunable pore size distribution and an electrochemically active surface area, wherein the electrochemically-active surface area is greater than a surface area of graphene having at least one layer, the surface area of graphene having at least one layer being about 2630 $m^2g^{-1}$; and wherein the carbon containing material is a dairy-based precursor.

2. The electrode of claim 1, wherein the tunable pore size distribution of the structurally-modified activated carbon material is modulated to have at least one of a micropore volume and a mesopore volume, the mesopore volume being equal to or greater than the micropore volume of a total pore volume distributed within the structurally-modified activated carbon material.

3. The electrode of claim 1, wherein the structurally-modified activated carbon material has an enhanced energy storage capacity relative to a corresponding current density, the enhanced energy storage capacity being a function of the mesopore volume distributed within the structurally-modified activated carbon material.

4. The electrode of claim 1, wherein the structurally-modified activated carbon material has a microporosity of a pore size that is less than 2 nm, and a mesoporosity of a pore size within a range of about 2 nm to about 50 nm.

5. The electrode of claim 1, wherein the structurally-modified activated carbon material comprises at least one of an undoped carbon material and a doped carbon material, wherein a dopant of the doped carbon material is at least one of a nitrogen atom and an oxygen atom, the dopant having an atomic content of about 0.2 weight % to about 20 weight % of a total weight of the structurally-modified activated carbon material.

6. A positive electrode of an ion energy storage device, the positive electrode comprising:
a structurally-modified activated carbon material of claim 1.

7. A negative electrode of an ion energy storage device, the negative electrode comprising:
a structurally-modified activated carbon material of claim 1.

8. An energy storage device, comprising:
an electrode, the electrode comprising a structurally-modified activated carbon material derived from a carbon containing material having a heterogeneous micelle-stabilized structure, the structurally-modified activated carbon material comprising a tunable pore size distribution and an electrochemically active surface area, wherein the electrochemically active surface area is greater than a surface area of graphene having at least one layer, the surface area of graphene having at least one layer being about 2630 $m^2g^{-1}$; and wherein the carbon containing material is a dairy-based precursor.

9. The energy storage device of claim 8, wherein the tunable pore size distribution of the structurally-modified activated carbon material is modulated to have at least one of a micropore volume and a mesopore volume, the mesopore volume being either equal to or greater than the micropore volume of a total pore volume distributed within the structurally-modified activated carbon material.

10. The energy storage device of claim 8, wherein the structurally-modified activated carbon material has an enhanced energy storage capacity relative to a corresponding current density, the enhanced energy storage capacity being a function of the mesopore volume distributed within the structurally-modified activated carbon material.

11. The energy storage device of claim 8, wherein the structurally-modified activated carbon material comprises at least one of an undoped carbon material and a doped carbon material, wherein a dopant of the doped carbon material is at least one of a nitrogen atom and an oxygen atom, the dopant having an atomic content of about 0.2 weight % to about 20 weight % of a total weight of the structurally-modified activated carbon material.

12. The energy storage device of claim 11, further comprising a supercapacitor, the supercapacitor utilizing at least one of an organic, an aqueous and an ionic liquid electrolytes, wherein the structurally-modified activated carbon material of the electrode is the undoped carbon material.

13. The energy storage device of claim 8, further comprises a charge transfer ion selected from the group consisting of: lithium ion, calcium ion, sodium ion, potassium ion, hydrogen ion, magnesium ion, $ClO_4^-$, $PF_6^-$, or any combination thereof.

14. An energy storage device comprising:
an anode; and
a cathode, wherein at least one of the anode and the cathode comprise a structurally-modified carbon material derived from a carbon containing material having a heterogeneous micelle-stabilized structure, the structurally-modified activated carbon material comprising a tunable pore size distribution and an electrochemically active surface area, and
wherein the electrochemically active surface area is greater than a surface area of graphene having at least one layer, the surface area of graphene having at least one layer being about 2630 $m^2g^{-1}$; and wherein the carbon containing material is a dairy-based precursor.

15. The energy storage device of claim 14, wherein the structurally-modified activated carbon material is the anode, and the cathode comprises at least one of a lithium iron phosphate (LFP) cathode, a nickel cobalt aluminum (NCA) cathode, a nickel manganese cobalt (NMC) cathode, a lithium cobalt oxide (LCO) cathode, and a ceramic positive electrode.

16. The energy storage device of claim 14, wherein the structurally-modified activated carbon material is the cathode, and the anode comprises at least one of an oxide-based anode, a lithiated tin anode, a lithium metal anode, a sulfur-based anode, a selenium anode, a graphite anode, an activated carbon anode, a graphene anode, a silicon anode, a tin anode, an alloy anode, an oxide anode, a sulfide anode, a nitride anode, and a negative electrode.

17. A energy-storage device comprising:
a housing, the housing comprising dimensions that conform to standardized battery dimensions; and
a capacitor cell, the capacitor cell disposed in the housing and electrically coupled to the housing, wherein the capacitor cell comprises at least one of a positive electrode and a negative electrode, the at least one of the positive electrode and the negative electrode comprising a structurally-modified activated carbon material derived from a carbon containing material having a heterogeneous micelle-stabilized structure, the structurally-modified activated carbon material comprising a tunable pore size distribution and an electrochemically active surface area, and wherein the electrochemically active surface area is greater than a surface area of graphene having at least one layer, the surface area of graphene having at least one layer being about 2630 $m^2g^{-1}$; and wherein the carbon containing material is a dairy-based precursor.

18. The energy-storage device of claim 17, wherein the housing comprises a form factor of a D-cell sized battery, a pouch cell, a rectangular automotive starter battery scale cell, a C-cell sized battery, an AA-cell sized battery, an AAA-cell sized battery, a 18650 lithium ion battery, or a 26650 lithium ion battery.

19. The energy-storage device of claim 17, wherein the structurally-modified activated carbon material comprises at least one of an undoped carbon material and a doped carbon material, wherein a dopant of the doped carbon material is at least one of a nitrogen atom and an oxygen atom, the dopant having an atomic content of about 0.2 weight % to about 20 weight % of a total weight of the structurally-modified activated carbon material.

20. The energy-storage device of claim 17, further comprising at least one of an electrochemical capacitor, primary or secondary battery, a flow battery, a dionization capacitor, a supercapattery, and other energy storage system based on ions that are reversibly or irreversibly stored at a positive electrode and a negative electrode.

* * * * *